US012732500B2

(12) United States Patent
Trost et al.

(10) Patent No.: US 12,732,500 B2
(45) Date of Patent: Sep. 8, 2026

(54) QUANTUM ENTANGLEMENT COMMUNICATION SERVICE

(71) Applicant: AT&T Intellectual Property I, L.P., Atlanta, GA (US)

(72) Inventors: William Trost, Mequon, WI (US); Luis Albisu, Woodbridge, VA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 42 days.

(21) Appl. No.: 18/936,039

(22) Filed: Nov. 4, 2024

(65) Prior Publication Data

US 2026/0129044 A1 May 7, 2026

Related U.S. Application Data

(63) Continuation of application No. 18/117,507, filed on Mar. 6, 2023, now Pat. No. 12,137,096, which is a continuation of application No. 16/953,395, filed on Nov. 20, 2020, now Pat. No. 11,606,356.

(51) Int. Cl.
*H04L 9/40* (2022.01)
*G06F 21/60* (2013.01)
*G06F 21/62* (2013.01)
*G06N 10/20* (2022.01)
(Continued)

(52) U.S. Cl.
CPC ........ *H04L 63/0876* (2013.01); *G06F 21/606* (2013.01); *G06F 21/6218* (2013.01); *G06N 10/20* (2022.01); *G06N 10/60* (2022.01); *H04B 10/70* (2013.01); *H04L 63/0807* (2013.01); *H04L 63/0823* (2013.01)

(58) Field of Classification Search
CPC ... G06F 21/6218; G06F 21/606; G06N 10/00; G06N 10/20; G06N 10/60; H04B 10/70; H04L 63/0823
USPC ......................... 726/7, 9, 3, 17, 20; 977/933
See application file for complete search history.

(56) References Cited

U.S. PATENT DOCUMENTS 11,074,104 B2 7/2021 Gambetta
11,120,358 B2 9/2021 Horesh
(Continued)

OTHER PUBLICATIONS

U.S. Office Action mailed on Jul. 22, 2022 in U.S. Appl. No. 16/953,395.

(Continued)

*Primary Examiner* — Arnold M Kinkead
(74) *Attorney, Agent, or Firm* — Hartman & Citrin LLC

(57) ABSTRACT

A quantum entanglement communication service can be provided by detecting a request to access data stored at a first computer. In response to detecting the data access request, a request can be generated to request that a server computer generate an entangled particle pair. Measurement data can be received, the measurement data corresponding to a measurement observed after interacting a first bit of a token stored at a second computer with a first entangled particle from the entangled particle pair. An operation to perform on a second entangled particle of the entangled particle pair at the first computer can be determined and performed. A state of the second entangled particle can be measured to obtain a value, and a bit string can be generated, where the bit string can include a number that corresponds to the value.

20 Claims, 8 Drawing Sheets

(51) Int. Cl.
*G06N 10/60* (2022.01)
*H04B 10/70* (2013.01)

(56) References Cited

U.S. PATENT DOCUMENTS 11,663,510 B1 * 5/2023 Carter, Jr. .............. B82Y 10/00 257/31
12,591,709 B2 * 3/2026 LaFever .............. G06F 21/6254
2020/0350990 A1 11/2020 Beattie, Jr.

OTHER PUBLICATIONS

U.S. Notice of Allowance mailed on Nov. 2, 2022 in U.S. Appl. No. 16/953,395.
U.S. Office Action mailed on Feb. 15, 2024 in U.S. Appl. No. 18/117,507.
U.S. Notice of Allowance mailed on Jul. 3, 2024 in U.S. Appl. No. 18/117,507.

* cited by examiner

QUANTUM ENTANGLEMENT COMMUNICATION SERVICE

CROSS-REFERENCE TO RELATED APPLICATIONS

This application is a continuation of and claims priority to U.S. patent application Ser. No. 18/117,507, entitled "Quantum Entanglement Communication Service," filed Mar. 6, 2023, now U.S. Pat. No. 12,137,096, which is incorporated herein by reference in its entirety, and which is a continuation of and claims priority to U.S. patent application Ser. No. 16/953,395, entitled "Quantum Entanglement Communication Service," filed Nov. 20, 2020, now U.S. Pat. No. 11,606,356, which is incorporated herein by reference in its entirety.

BACKGROUND

In some communications networks, sensitive and ultra-sensitive data can be stored for use by various devices and/or users. Malicious actors may be able to observe communications in and/or through some communications networks to intercept such sensitive and/or ultra-sensitive data and/or to gain access to such data. Even some multi-factor authentication technologies cannot stop certain attackers with access to a communication link and/or a computer involved in a trusted communication channel. Thus, some malicious actors may observe communications of sensitive and ultra-sensitive data and/or may access such data without being properly authenticated.

SUMMARY

The present disclosure is directed to a quantum entanglement communication service. A first device (e.g., a receiving device) can request data from a second device (e.g., a transmitting device). In some embodiments, for example, the receiving device can send a data access request to the transmitting device. The data access request can be used to request data that can be stored at the transmitting device. The data, however, may be sensitive data and the transmitting device may require authentication to receive the data. According to embodiments of the concepts and technologies disclosed herein, the receiving device can store a token having a number of bits.

The transmitting device may know the number of bits included in the token, in some embodiments. In some other embodiments, the data access request may specify the number of bits in the token. The transmitting device can generate a request. The request can request that a server computer (e.g., via execution of a quantum entanglement communication service) generate an entangled particle pair for each bit of the token. The request also can specify endpoints for a communication session or link in or over which the data can be shared. The server computer can generate the requested entangled particle pairs that can include entangled particles. According to various embodiments of the concepts and technologies disclosed herein, the phrase "entangled particles" as used, illustrated, and/or described herein, can be used to refer to photons in an Einstein-Podolsky-Rosen ("EPR") entangled state, Bell state particles, or the like. The server computer can provide, to the transmitting device, one particle from each entangled particle pair. The server computer also can provide, to the receiving device, the other entangled particles from each entangled particle pair. The transmitting device and the receiving device can store the entangled particles in order, if more than one entangled particle is received.

In response to receiving the entangled particles, the receiving device can begin the authentication using quantum entanglement as illustrated and described herein. The receiving device can select a first bit of the token and a first entangled particle. The receiving device can interact the first bit of the token with the first entangled particle, e.g., via a controlled NOT ("CNOT") gate, followed by putting the token bit into a superposition state via a Hadamard gate, and measure the system. The receiving device can generate measurement data, e.g., by measuring the token bit and the entangled particle, where the measurement data can capture the observed or measured state of the system, which can be one value of 00, 01, 10, or 11. The receiving device can send the measurement data to the transmitting device. The transmitting device can select a first entangled particle and determine an operation to perform on the first entangled particle based on the measurement data.

Namely, if the measurement data indicates that the measurement 00 was observed (e.g., measured) at the receiving device, the transmitting device may take no action on its corresponding entangled particle. If the measurement data indicates that the measurement 01 was observed (e.g., measured) at the receiving device, the transmitting device may perform an X gate operation on its corresponding entangled particle. If the measurement data indicates that the measurement 10 was observed (e.g., measured) at the receiving device, the transmitting device may perform a Z gate operation on its corresponding entangled particle. If the measurement data indicates that the measurement 11 was observed (e.g., measured) at the receiving device, the transmitting device may perform an X gate operation and a Z gate operation on its corresponding entangled particle.

The transmitting device can perform the determined operation on the entangled particle and measure the state of the entangled particle. The measured state may be a value of either 0 or 1. The transmitting device can store the state as the first bit of the token. As long as additional bits of the token remain, these operations by the receiving device and the transmitting device may be repeated until the transmitting device or the receiving device determines that no additional bits of the token remain to be transmitted. When no more bits of the token remain, the transmitting device can be in possession of a bit string that can match the token. The bit string can be communicated to an authentication service to authenticate the receiving device (e.g., using the bit string). If authentication is successful, the transmitting device can provide the data to the receiving device.

According to one aspect of the concepts and technologies disclosed herein, a system is disclosed. The system can include a first computer having a processor and a memory as well as a quantum processor capable of performing a quantum algorithm and quantum memory capable of storing quantum state. The memory can store computer-executable instructions that, when executed by the processor, cause the processor to perform operations whether classical or quantum instructions. The operations can include detecting, at the first computer, a data access request to access data stored at the first computer; and in response to detecting the data access request, generating, by the first computer, a request including a request that a server computer generate an entangled particle pair.

The server computer can include an entangled particle pair generator. The operations further can include receiving, by the first computer, measurement data that corresponds to a measurement observed after interacting a first bit of a token stored at a second computer with a first entangled particle from the entangled particle pair; determining, by the first computer, an operation to perform on a second entangled particle of the entangled particle pair at the first computer; performing, by the first computer, the operation on the second entangled particle; measuring, at the first computer, a state of the second entangled particle, the state including a value; and generating, by the first computer, a bit string including a number that corresponds to the value.

In some embodiments, the measurement can include a value of 00, and the operation on the second entangled particle can include measuring the state of the second particle. In some embodiments, the measurement can include a value of 01, and the operation on the second entangled particle can include performing an X gate operation on the second entangled particle. In some embodiments, the measurement can include a value of 10, and the operation on the second entangled particle can include performing a Z gate operation on the second entangled particle. In some embodiments, the measurement can include a value of 11, and the operation on the second entangled particle can include performing an X gate operation and a Z gate operation on the second entangled particle.

In some embodiments, the request specifies endpoints of a communication link over which the data is to be transmitted. The endpoints can include the first computer and the second computer. The server computer can send the second entangled particle to the second computer. In some embodiments, the computer-executable instructions, when executed by the processor, cause the processor to perform operations that further can include determining if the token can include another bit, and in response to determining that the token can include the other bit: receiving another instance of measurement data, where the other instance of measurement data can include another measurement observed after interacting a second bit of the token with a third entangled particle from another entangled particle pair; obtaining a fourth entangled particle; determining another operation to perform on the fourth entangled particle based on the other value; performing the operation on the fourth entangled particle; measuring a state of the fourth entangled particle, the state including another value; and adding another number that corresponds to the other value to the bit string. In some embodiments, the first computer can include entangled particle isolation and measurement hardware.

According to another aspect of the concepts and technologies disclosed herein, a method is disclosed. The method can include detecting, at a first computer including a processor, a data access request to access data stored at the first computer; in response to detecting the data access request, generating, by the processor, a request including a request that a server computer generate an entangled particle pair, where the server computer can include an entangled particle pair generator; receiving, by the processor, measurement data that corresponds to a measurement observed after interacting a first bit of a token stored at a second computer with a first entangled particle from the entangled particle pair; determining, by the processor, an operation to perform on a second entangled particle of the entangled particle pair at the first computer; performing, by the processor, the operation on the second entangled particle; measuring, at the first computer, a state of the second entangled particle, the state including a value; and generating, by the processor, a bit string including a number that corresponds to the value.

In some embodiments, the measurement can include a value of 00, and the operation on the second entangled particle can include measuring the state of the second particle. In some embodiments, the measurement can include a value of 01, and the operation on the second entangled particle can include performing an X gate operation on the second entangled particle. In some embodiments, the measurement can include a value of 10, and the operation on the second entangled particle can include performing a Z gate operation on the second entangled particle. In some embodiments, the measurement can include a value of 11, and the operation on the second entangled particle can include performing an X gate operation and a Z gate operation on the second entangled particle.

In some embodiments, the request specifies a number of bits in the token, and the request for generation of an entangled particle pair can include a request to generate the number of entangled particle pairs. In some embodiments, the request specifies endpoints of a communication link over which the data is to be transmitted. The endpoints can include the first computer and the second computer. The server computer can send the second entangled particle to the second computer.

In some embodiments, the method further can include determining, by the processor, if the token can include another bit, and in response to determining that the token can include the other bit: receiving another instance of measurement data, wherein the other instance of measurement data can include another measurement observed after interacting a second bit of the token with a third entangled particle from another entangled particle pair; obtaining a fourth entangled particle; determining another operation to perform on the fourth entangled particle based on the other value; performing the operation on the fourth entangled particle; measuring a state of the fourth entangled particle, the state including another value; and adding another number that corresponds to the other value to the bit string. In some embodiments, the first computer can include entangled particle isolation and measurement hardware.

According to yet another aspect of the concepts and technologies disclosed herein, a computer storage medium is disclosed. The computer storage medium can store computer-executable instructions that, when executed by a processor, cause the processor to perform operations. The operations can include detecting, at the first computer, a data access request to access data stored at the first computer; and in response to detecting the data access request, generating, by the first computer, a request including a request that a server computer generate an entangled particle pair. The server computer can include an entangled particle pair generator. The operations further can include receiving, by the first computer, measurement data that corresponds to a measurement observed after interacting a first bit of a token stored at a second computer with a first entangled particle from the entangled particle pair; determining, by the first computer, an operation to perform on a second entangled particle of the entangled particle pair at the first computer; performing, by the first computer, the operation on the second entangled particle; measuring, at the first computer, a state of the second entangled particle, the state including a value; and generating, by the first computer, a bit string including a number that corresponds to the value.

In some embodiments, the request specifies endpoints of a communication link over which the data is to be transmitted, wherein the endpoints include the first computer and the second computer, and wherein the server computer sends the second entangled particle to the second computer. In some embodiments, the computer-executable instructions, when executed by the processor, can cause the processor to perform operations that further can include determining if the token can include another bit, and in response to determining that the token can include the other bit: receiving another instance of measurement data, wherein the other instance of measurement data can include another measurement observed after interacting a second bit of the token with a third entangled particle from another entangled particle pair; obtaining a fourth entangled particle; determining another operation to perform on the fourth entangled particle based on the other value; performing the operation on the fourth entangled particle; measuring a state of the fourth entangled particle, the state including another value; and adding another number that corresponds to the other value to the bit string.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

Figure 1:
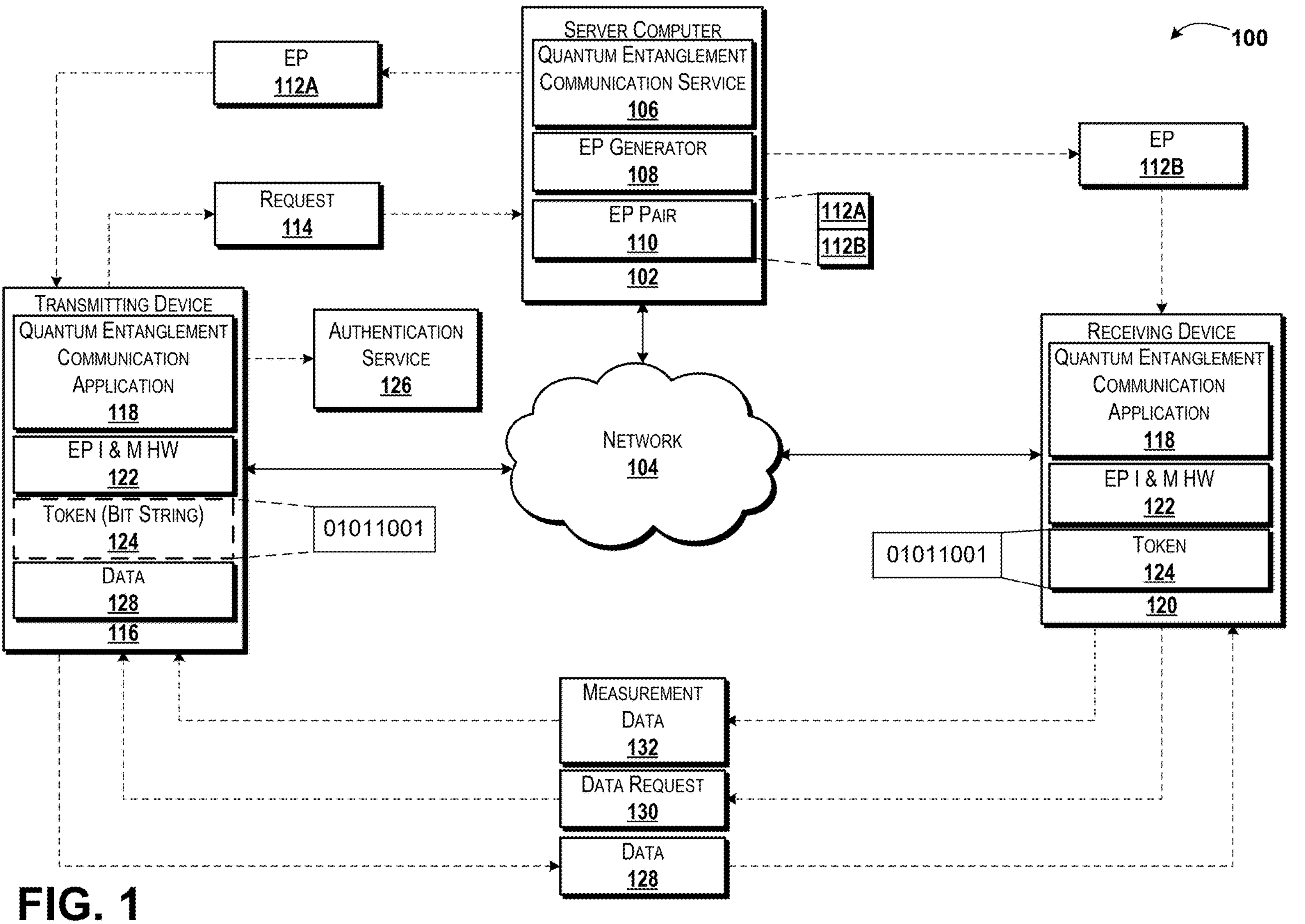
FIG. 1 is a system diagram illustrating an illustrative operating environment for various embodiments of the concepts and technologies described herein.

The following detailed description is directed to a quantum entanglement communication service. A first device (e.g., a receiving device) can request data from a second device (e.g., a transmitting device). In some embodiments, for example, the receiving device can send a data access request to the transmitting device. The data access request can be used to request data that can be stored at the transmitting device. The data, however, may be sensitive data and the transmitting device may require authentication to receive the data. According to embodiments of the concepts and technologies disclosed herein, the receiving device can store a token having a number of bits.

The transmitting device may know the number of bits included in the token, in some embodiments. In some other embodiments, the data access request may specify the number of bits in the token. The transmitting device can generate a request. The request can request that a server computer (e.g., via execution of a quantum entanglement communication service) generate an entangled particle pair for each bit of the token. The request also can specify endpoints for a communication session or link in or over which the data can be shared. The server computer can generate the requested entangled particle pairs that can include entangled particles. According to various embodiments of the concepts and technologies disclosed herein, the phrase "entangled particles" as used, illustrated, and/or described herein, can be used to refer to photons in an EPR entangled state, Bell state particles, or the like. The server computer can provide, to the transmitting device, one particle from each entangled particle pair. The server computer also can provide, to the receiving device, the other entangled particles from each entangled particle pair. The transmitting device and the receiving device can store the entangled particles in order, if more than one entangled particle is received.

In response to receiving the entangled particles, the receiving device can begin the authentication using quantum entanglement as illustrated and described herein. The receiving device can select a first bit of the token and a first entangled particle. The receiving device can interact the first bit of the token with the first entangled particle, e.g., via a CNOT gate, followed by putting the token bit into a superposition state via a Hadamard gate, and measure the system. The receiving device can generate measurement data, e.g., by measuring the token bit and the entangled particle, where the measurement data can capture the observed or measured state of the system, which can be one value of 00, 01, 10, or 11. The receiving device can send the measurement data to the transmitting device. The transmitting device can select a first entangled particle and determine an operation to perform on the first entangled particle based on the measurement data.

Namely, if the measurement data indicates that the measurement 00 was observed (e.g., measured) at the receiving device, the transmitting device may take no action on its corresponding entangled particle. If the measurement data indicates that the measurement 01 was observed (e.g., measured) at the receiving device, the transmitting device may perform an X gate operation on its corresponding entangled particle. If the measurement data indicates that the measurement 10 was observed (e.g., measured) at the receiving device, the transmitting device may perform a Z gate operation on its corresponding entangled particle. If the measurement data indicates that the measurement 11 was observed (e.g., measured) at the receiving device, the transmitting device may perform an X gate operation and a Z gate operation on its corresponding entangled particle.

The transmitting device can perform the determined operation on the entangled particle and measure the state of the entangled particle. The measured state may be a value of either 0 or 1. The transmitting device can store the state as the first bit of the token. As long as additional bits of the token remain, these operations by the receiving device and the transmitting device may be repeated until the transmitting device or the receiving device determines that no additional bits of the token remain to be transmitted. When no more bits of the token remain, the transmitting device can be in possession of a bit string that can match the token. The bit string can be communicated to an authentication service to authenticate the receiving device (e.g., using the bit string). If authentication is successful, the transmitting device can provide the data to the receiving device.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for a quantum entanglement communication service will be described, according to an illustrative embodiment. The operating environment 100 shown in FIG. 1 includes a server computer 102. The server computer 102 can operate in communication with and/or as part of a communications network ("network") 104, though this is not necessarily the case.

According to various embodiments, the functionality of the server computer 102 may be provided by various computing devices including, but not limited to, one or more server computers, desktop computers, laptop computers, application servers, other computing systems, and the like. It should be understood that the functionality of the server computer 102 can be provided by a single device, by two or more similar devices, and/or by two or more dissimilar devices. For purposes of describing the concepts and technologies disclosed herein, the server computer 102 is described herein as a server computer. It should be understood that this embodiment is illustrative, and should not be construed as being limiting in any way.

The server computer 102 can execute an operating system (not labeled in FIG. 1) and one or more application programs such as, for example, a quantum entanglement communication service 106. The operating system can include a computer program for controlling the operation of the server computer 102. The quantum entanglement communication service 106 can include an executable program that can be configured to execute on top of the operating system to provide various functions as illustrated and described herein. Prior to describing the functionality of the quantum entanglement communication service 106 in more detail, some of the other entities of the operating environment 100 will be disclosed to aid in describing the functionality of the quantum entanglement communication service 106.

As shown in FIG. 1, the server computer 102 also can include an entangled particle generator 108 (labeled "EP generator 108" in FIG. 1). The entangled particle generator 108 can be configured to generate an entangled particle pair 110 (labeled "EP pair 110" in FIG. 1). The entangled particle pair 110 can include a first entangled particle 112A and a second entangled particle 112B. According to various embodiments, the quantum entanglement communication service 106 can be configured to control the entangled particle generator 108. Thus, it can be appreciated the quantum entanglement communication service 106 can trigger the entangled particle generator 108 to generate one or more entangled particle pairs 110 on demand (e.g., in response to the quantum entanglement communication service 106 receiving a request 114 from a device such as the transmitting device 116 illustrated in FIG. 1), or at other times as will be illustrated and described herein.

As is generally understood, quantum entanglement of two entangled particles 112A, 112B can be broken simply by observing or measuring one of the entangled particles 112A, 112B. Similarly, the quantum entanglement of two entangled particles 112A, 112B can be broken by any interaction between an entangled particle 112, 112B and its environment. Furthermore, a measurement of an entangled particle 112A will be random without additional information, so a measurement without knowing more is useless. Finally, because quantum state cannot be cloned (provably forbidden by quantum mechanics), the entangled particles 112A, 112B and their observed states are impossible to observe, measure, or clone without destroying the quantum entanglement between the entangled particles 112A, 112B. These and other features of entangled particles 112A, 112B are used by embodiments of the concepts and technologies disclosed herein to provide access to certain types of information and/or devices.

As shown in FIG. 1, the operating environment 100 also can include a receiving device 120. The receiving device 120 can also execute the quantum entanglement communication application 118 (e.g., the receiving device 120 can also store instructions that can correspond to an instance of an embodiment of the quantum entanglement communication application 118 illustrated and described herein). Via execution of respective instances of the quantum entanglement communication application 118, the transmitting device 116 and the receiving device 120 can communicate in a secure fashion as will be illustrated and described herein.

The transmitting device 116 and the receiving device 120 can also include an instance of entangled particle isolation and measurement hardware 122 (labeled "EP I & M HW 122" in FIG. 1). The entangled particle isolation and measurement hardware 122 can include an isolation chamber or other hardware for isolating entangled particles such as the entangled particle 112A and the entangled particle 112B. In some embodiments of the concepts and technologies disclosed herein, the entangled particle isolation and measurement hardware 122 can include, for example, a quantum memory. The entangled particle isolation and measurement hardware 122 also can include hardware for measuring a state of the entangled particles 112A, 112B; systems including the entangled particles 112A, 112B; and the like. The entangled particle isolation and measurement hardware 122 also can include a quantum processor, Hadamard gates, and/or other hardware.

According to various embodiments of the concepts and technologies disclosed herein, the receiving device 120 also can store a token 124, which in various embodiments can be stored via traditional and/or classical memory technologies. The token 124 can include any bit string of one bit or more, though tokens 124 often can include tens, hundred, thousands, or even millions of bits. The token 124 can be obtained by the receiving device 120 in various manners, as generally is understood. In the illustrated embodiment, the operating environment 100 also can include an authentication service 126. The authentication service 126 can correspond to an authentication server, a certificate authority, or the like. In the illustrated embodiment, the authentication service 126 can include a certificate authority that can issue a certificate or the token 124 to the receiving device 120, and also can include functionality for performing an authentication function as will be illustrated and described herein.

For purposes of simplifying the description of the concepts and technologies disclosed herein, an example token 124 having a bit length of eight bits is illustrated in FIG. 1. Of course, this is merely a simplified example and should not be construed as being limiting in any way. Furthermore, because authentication and the issuance of certificates and/or tokens 124 can be performed in a variety of manners by a variety of devices and/or entities, it should be understood that these examples are illustrative, and therefore should not be construed as being limiting in any way. Now that the elements of the operating environment 100 have been introduced, the functionality of the quantum entanglement communication service 106 and the quantum entanglement communication application 118 will now be described in additional detail.

According to various embodiments of the concepts and technologies disclosed herein, the transmitting device 116 and the receiving device 120 can be configured to establish a communications link with each other. The communications link can be established via any desired media including, but not limited to, wired communications technologies, wireless technologies, and the like. Thus, it should be understood that the communications link can be established via the network 104, in some embodiments and/or other networks as illustrated and described herein. In some embodiments, the communications link can be established after the transmitting device 116 and/or the receiving device 120 authenticate with each other and/or the server computer 102. According to various embodiments of the concepts and technologies disclosed herein, however, the communications link between the transmitting device 116 and the receiving device 120 need not be a secure channel, as will be explained in more detail below. It should be understood that this example is illustrative, and therefore should not be construed as being limiting in any way.

As shown in FIG. 1, the transmitting device 116 can possess data 128, and the receiving device 120 can attempt to access or obtain the data 128, for example via generating a data access request 130 (labeled "data request 130" in FIG. 1). The data 128 can be any information in any format including files, streaming data, etc., that the transmitting device 116 is to transmit and/or provide to the receiving device 120. According to various embodiments, however, the data 128 can be sensitive data that will only be provided to properly authenticating entities. In some embodiments, the data 128 can correspond to super-sensitive data, and therefore may only be provided to the receiving device 120 if the receiving device 120 can authenticate as illustrated and described herein.

In particular, the quantum entanglement communication application 118 executed by the transmitting device 116 can be configured to use entangled particles 112A, 112B to determine if the receiving device 120 should be able to access the data 128. As will be appreciated with reference to the embodiments of the concepts and technologies disclosed herein, the use of quantum entanglement to grant or deny access can prevent observers or other unauthorized entities from intercepting authentication information and/or otherwise gaining unauthorized access to the data 128. It should be understood that this example is illustrative, and therefore should not be construed as being limiting in any way.

According to various embodiments of the concepts and technologies disclosed herein, the transmitting device 116 (e.g., via execution of the quantum entanglement communication application 118) can be configured to generate a request 114. According to various embodiments of the concepts and technologies disclosed herein, the request 114 generated by the transmitting device 116 can specify two endpoints a number of bits in the token 124. It should be clarified that while the transmitting device 116 does not possess a copy of the token 124, the transmitting device 116 can be aware of the number of bits in the token 124 in some embodiments. In some other embodiments, the receiving device 120 can inform the transmitting device 116 of the number of bits in the token 124 when requesting access to the transmitting device (e.g., by including the number of bits in the data access request 130 illustrated and described herein).

According to some embodiments, the endpoints identified in the request 114 will include the transmitting device 116 and a device that is to receive the data 128 if authenticated. In the illustrated embodiment of FIG. 1, the endpoints will include the transmitting device 116 and the receiving device 120. Either or both of the endpoints can be identified by one or more device identifiers (e.g., an international mobile subscriber identity ("IMSI"), an international mobile equipment identity ("IMEI"), a subscriber permanent identity ("SUPI"), a media access control identifier ("MAC ID"), etc.), network identifiers (e.g., an IP address, a network ID, etc.), user information (e.g., account information, user ID, etc.), or other identifiers.

The request 114 can be sent to the server computer 102 to request that the quantum entanglement communication service 106 generates an entangled particle pair 110. The server computer 102 can be configured to analyze the request 114 to determine the endpoints, which will correspond to entities that will receive the entangled particles 112A, 112B. In some embodiments of the concepts and technologies disclosed herein, the transmitting device 116 can be configured to generate a request 114 for an entangled particle pair 110 for each bit of the token 124 (e.g., the operations for generating the request 114 can be iterated for each bit of the token 124).

In some other embodiments, the request 114 can specify the number of bits in the token 124, and the server computer 102 can be configured to generate a corresponding number of entangled particle pairs 110 (e.g., if the token 124 has eight bits, the server computer 102 can be configured to generate eight entangled particle pairs 110; if the token 124 has one hundred bits, the server computer 102 can be configured to generate one hundred entangled particle pairs 110; etc.). In yet other embodiments, the first request 114 for an entangled particle pair 110 can be generated by the transmitting device 116, and the receiving device 120 can generate subsequent requests 114 for entangled particle pairs 110 (e.g., a new request 114 can be made by the receiving device 120 for each bit of the token 124 that is to be used to authenticate with the transmitting device 116). Thus, it can be appreciated that in some embodiments, the transmitting device 116 does not need to know the number of bits in the token 124. It should be understood that this example is illustrative, and therefore should not be construed as being limiting in any way.

The server computer 102 (e.g., via execution of the quantum entanglement communication service 106) can be configured to generate one or more entangled particle pairs 110, and to provide one or more entangled particles 112A from the entangled particle pairs 110 to the transmitting device 116, and to provide the other (second) entangled particles 112B from the entangled particle pairs 110 to the receiving device 120. As is generally understood, the entangled particles 112A, 112B from the entangled particle pair 110 can be entangled, and therefore operations performed on one of the entangled particles 112A may result in a change to the entangled particle 112B, subject to various requirements of quantum mechanics.

In the embodiment shown in FIG. 1, the server computer 102 can generate eight entangled particle pairs 110, and then can send eight entangled particles 112A to the transmitting device 116 and eight entangled particles 112B to the receiving device 120. As noted above, one entangled particle pair 110 can be generated at a time in some embodiments, so this is merely an illustrative embodiment and should not be construed as being limiting in any way.

The transmitting device 116 can be configured (e.g., via execution of the quantum entanglement communication application 118) to receive the entangled particles 112A and to store the entangled particles 112A using the entangled particle isolation and measurement hardware 122. The entangled particle isolation and measurement hardware 122 can be configured to isolate the entangled particles 112A from external observation and/or interactions, and to store the entangled particles 112A in order, if more than one entangled particle 112A is provided at one time. Similarly, the receiving device 120 can be configured to receive the one or more entangled particle 112B and to store the entangled particles 112B using the entangled particle isolation and measurement hardware 122. The entangled particle isolation and measurement hardware 122 can be configured to isolate the entangled particle 112B from external observation and/or interactions, and to store the entangled particles 112B in order, if more than one entangled particle 112B is provided at one time.

In some embodiments, though not illustrated in FIG. 1, the transmitting device 116 can be configured (e.g., via execution of the quantum entanglement communication application 118), to generate a challenge or other response to the data access request 130. Such a challenge or response, if generated, can be sent to the receiving device 120 and can prompt the receiving device 120 to begin providing the token 124 as illustrated and described herein. In some other embodiments, the challenge can be omitted, and receipt of the one or more entangled particles 112B by the receiving device 120 can cause the receiving device 120 to begin providing information representing the token 124 as illustrated and described herein. It should be understood that these examples are illustrative, and therefore should not be construed as being limiting in any way.

The receiving device 120 can be configured (e.g., via execution of the quantum entanglement communication application 118) to begin authentication with the transmitting device 116 in response to receiving the entangled particles 112B. In particular, the receiving device 120 can be configured to identify a first bit of the token 124. The receiving device 120 also can be configured to select a first entangled particle 112B, if more than one entangled particle 112B is provided at one time, or to use the entangled particle 112B if only one entangled particle 112B is provided at one time. For purposes of simplifying the description of the concepts and technologies disclosed herein, the embodiment where multiple entangled particles 112B are received at one time will be described as an example embodiment. It should be understood that this example is illustrative, and therefore should not be construed as being limiting in any way.

The receiving device 120 can be configured to interact the first bit of the token (in the illustrated embodiment a "0") with the first entangled particle 112B, and to measure the system after the interaction. In one contemplated embodiment, for example, the receiving device 120 can interact the first bit of the token with the first entangled particle 112B (e.g., via a CNOT gate), and can put the token bit into a superposition state via a Hadamard gate, and then measure the system. The receiving device 120 can be configured (e.g., via execution of the quantum entanglement communication application 118) to generate measurement data 132. The measurement data 132 can describe the observed measurement of the entangled particle 112B as observed at the receiving device 120 after interacting the bit of the token 124 with the entangled particle. It can be appreciated that the measurement will be in the form of two bits, and will have a value of 00, 01, 10, or 11. The receiving device 120 can generate the measurement data 132 and send the measurement data 132 to the transmitting device 116.

It can be appreciated that measurement or observation of the entangled particle 112B at the receiving device 120 will destroy the entangled system of the token bit and the receivers half of the entangled particle pair 110, but the observed state can be used as will be illustrated and described herein. It should be noted, however, that for each bit of the token 124, the transmitting device 116 or the receiving device 120 can be configured to generate the request 114; to receive entangled particles 112A, 112B; to store the entangled particle 112A, 112B; to interact one of the entangled particles 112A, 112B with a bit from the token 124; to generate and/or receive the measurement data 132; and/or other operations as illustrated and described herein.

As such, the concepts and technologies disclosed herein may appear to be inefficient and counterintuitive. Embodiments of the concepts and technologies disclosed herein, however, can result in the ability to transmit information corresponding to the token 124 that is impervious to unauthorized access and/or observation, since the token 124 itself is never transmitted and since interception of the measurement data 132 will be useless to any entity not in possession of the other entangled particle 112A. It should be understood that this example is illustrative, and therefore should not be construed as being limiting in any way.

The transmitting device 116 can be configured (e.g., via execution of the quantum entanglement communication application 118), to receive the measurement data 132. As noted above, the measurement data 132 can describe the measurement of the measurement of the entangled particle 112B at the receiving device 120 with a bit of the token 124, and therefore can have one of four measurements, 00, 01, 10, or 11. Based on the observed measurement at the receiving device 120, the transmitting device 116 can be configured to perform an operation on the entangled particle 112A to determine the corresponding bit of the token 124.

In particular, if the measurement data 132 indicates that the measurement 00 was observed (e.g., measured) at the receiving device 120, the transmitting device 116 may be configured to take no action on its corresponding entangled particle 112A (e.g., the first entangled particle 112A in a first iteration of this process), and to measure the state of the entangled particle 112A. The measured state of the entangled particle will be a 0 or a 1, and the measured state can correspond to the first bit of the token 124. Similarly, if the measurement data 132 indicates that the measurement 01 was observed (e.g., measured) at the receiving device 120, the transmitting device 116 can be configured to perform an X gate operation on its corresponding entangled particle 112A (e.g., the first entangled particle 112A in a first iteration of this process), and then measure the state of the entangled particle 112A. The measured state of the entangled particle can be a 0 or a 1, and the measured state can correspond to the first bit of the token 124.

If the measurement data 132 indicates that the measurement 10 was observed (e.g., measured) at the receiving device 120, the transmitting device 116 can be configured to perform a Z gate operation on its corresponding entangled particle 112A (e.g., the first entangled particle 112A in a first iteration of this process), and then can measure the state of the entangled particle 112A. The measured state of the entangled particle can be a 0 or a 1, and the measured state can correspond to the first bit of the token 124. Finally, if the measurement data 132 indicates that the measurement 11 was observed (e.g., measured) at the receiving device 120, the transmitting device 116 can be configured to perform an X gate operation and a Z gate operation on its corresponding entangled particle 112A (e.g., the first entangled particle 112A in a first iteration of this process), and then can measure the state of the entangled particle 112A. The measured state of the entangled particle can be a 0 or a 1, and the measured state can correspond to the first bit of the token 124.

Thus, it can be appreciated that the embodiments of the concepts and technologies disclosed herein can effectively transmit the first bit of the token 124 by way of the entangled particles 112A, 112B and the measurement data 132. In other words, the first bit of the token 124 can be communicated by the receiving device 120 to the transmitting device 116 without actually transmitting the bit, but rather by communicating the measurement data 132 and using the entangled particles 112A, 112B. It should be understood that this example is illustrative, and therefore should not be construed as being limiting in any way.

According to various embodiments of the concepts and technologies disclosed herein, after the first instance of measurement data 132 is transmitted (e.g., corresponding to the first bit of the token 124), the transmitting device 116 or the receiving device can determine if additional bits of the token 124 remain. If so, the transmitting device 116 or the receiving device 120 can be configured to generate a request 114 (for another entangled particle pair 110 if only one entangled particle pair 110 is generated initially), or the receiving device 120 can select a next entangled particle 112B (if multiple are provided at one time). The receiving device 120 can repeat the operations illustrated and described above (e.g., select a next bit of the token 124, interact the next bit of the token 124 with the next entangled particle 112B, measure the state of the system, and send measurement data 132 to the transmitting device 116).

Similarly, the transmitting device 116 can repeat its operations, namely, receive the measurement data 132, select or receive a next entangled particle 112A, perform an operation on the entangled particle 112A (if the measurement data is anything other than 00), measure the state of the entangled particle 112A after the operation, and record the observed measure as the next bit of a bit string. Thus, it can be appreciated that the above operations can be repeated by the transmitting device 116 and the receiving device 120 until each bit of the token 124 has been represented at the transmitting device 116. Thus, when the receiving device 120 and the transmitting device 116 have performed the above operations until no more bits remain in the token 124 at the receiving device 120, the transmitting device 116 will be in possession of a bit string that can represent, in order, each of the bits of the token 124.

According to some embodiments of the concepts and technologies disclosed herein, the receiving device 120 and the transmitting device 116 can be configured to communicate with each other regarding the communication of the token 124. For example, if the receiving device 120 and/or the transmitting device 116 detects an inadvertent operation or observation that was made of an entangled particle 112A, 112B, the receiving device 120 and/or the transmitting device 116 can be configured to request one or more new entangled particle pairs 110. Similarly, the receiving device 120 and/or the transmitting device 116 can be configured to instruct the other device (e.g., the receiving device 120 and/or the transmitting device 116) to disregard the corresponding entangled particle 112A, 112B of the inadvertently operated on and/or observed entangled particle 112A, 112B. Other error correction processes can be performed in accordance with various embodiments of the concepts and technologies disclosed herein. As such, it should be understood that this example is illustrative, and therefore should not be construed as being limiting in any way.

Thus, it can be appreciated that the transmitting device 116 can be configured to assemble the determined bits into a bit string. The bit string can be essentially identical to the token 124. Thus, embodiments of the concepts and technologies disclosed herein can be used to enable the transmitting device 116 to essentially recreate the token 124 at the transmitting device 116. Thus, it can be appreciated that embodiments of the concepts and technologies disclosed herein can be used to "transfer" the token 124 from the receiving device 120 to the transmitting device 116 without actually transferring the token 124 itself and/or bits thereof. Rather, the transmitting device 116 can generate the token 124 (or a bit string corresponding thereto) at the transmitting device 116 based on the bits represented by the state of the entangled particles 112A. It should be understood that this example is illustrative, and therefore should not be construed as being limiting in any way.

Once the bit string (which, as noted above can match the token 124) is in possession of the transmitting device 116, the transmitting device 116 can provide the bit string to the authentication service 126. It should be understood that the box having dashed lines and labeled "token 124" at the transmitting device 116 in FIG. 1 can correspond to the bit string (and not actually the token 124). The authentication service 126 can determine if the receiving device 120 is to be authenticated or not; and to issue an authentication decision to the transmitting device 116. If the receiving device 120 is authenticated, the transmitting device 116 can send the data 128 to the receiving device 120. If the receiving device 120 is not authenticated, the transmitting device 116 can block or deny transmission of the data 128 to the receiving device 120. It should be understood that these examples are illustrative, and therefore should not be construed as being limiting in any way.

In practice, a receiving device 120 can request data from a transmitting device 116. In some embodiments, for example, the receiving device 120 can send a data access request 130 to the transmitting device 116. The data access request 130 can be used to request data 128 that is stored at the transmitting device 116. The data 128, however, may be sensitive data and the transmitting device 116 may require authentication to receive the data 128.

According to embodiments of the concepts and technologies disclosed herein, the receiving device 120 can store a token 124 having a number of bits. The transmitting device 116 may know the number of bits, in some embodiments, or the data access request 130 may specify the number of bits of the token 124. In some other embodiments, the transmitting device 116 may not know the number of bits included in the token 124. The transmitting device 116 can generate a request 114. The request 114 can request that a server computer 102 (e.g., via execution of a quantum entanglement communication service 106) generate an entangled particle pair 110 for each bit of the token 124. The request 114 also can specify endpoints for a communication session or link in or over which the data 128 will be shared. The server computer 102 can generate the requested entangled particle pairs 110 that include entangled particles 112A, 112B. The server computer 102 can provide, to the transmitting device 116, the entangled particles 112A. The server computer 102 also can provide, to the receiving device 120, the entangled particles 112B. The transmitting device 116 and the receiving device 120 can store the entangled particles 112A, 112B in order.

In response to receiving the entangled particles 112B, the receiving device 120 can begin the authentication using quantum entanglement as illustrated and described herein. The receiving device 120 can select a first bit of the token 124 and a first entangled particle 112B. The receiving device 120 can interact the first bit of the token 124 with the first entangled particle 112B, and measure the system. The receiving device 120 can generate measurement data that captures the observed or measured state of the system, which can be one value of 00, 01, 10, or 11. The receiving device 120 can send the measurement data 132 to the transmitting device 116.

The transmitting device 116 can select a first entangled particle 112A, and determine an operation to perform on the first entangled particle 112A based on the measurement data 132. Namely, if the measurement data 132 indicates that the measurement 00 was observed (e.g., measured) at the receiving device 120, the transmitting device 116 can be configured to take no action on its corresponding entangled particle 112A. If the measurement data 132 indicates that the measurement 01 was observed (e.g., measured) at the receiving device 120, the transmitting device 116 can be configured to perform an X gate operation on its corresponding entangled particle 112A. If the measurement data 132 indicates that the measurement 10 was observed (e.g., measured) at the receiving device 120, the transmitting device 116 can be configured to perform a Z gate operation on its corresponding entangled particle 112A. If the measurement data 132 indicates that the measurement 11 was observed (e.g., measured) at the receiving device 120, the transmitting device 116 can be configured to perform an X gate operation and a Z gate operation on its corresponding entangled particle 112A. The transmitting device 116 can be configured to perform the determined operation on the entangled particle 112A and to measure the state of the entangled particle 112A. The state measured by the transmitting device 116 can be a value of either 0 or 1.

The transmitting device 116 can be configured to store the state as the first bit of the token 124. As long as additional bits of the token 124 remain, these operations by the receiving device 120 and the transmitting device 116 can be repeated until the transmitting device 116 or the receiving device 120 determines that no additional bits of the token 124 remain to be represented. When no more bits of the token 124 remain, the transmitting device 116 can be in possession of a bit string that can match the token 124, and can communicate the bit string to an authentication service 126 to authenticate the receiving device 120. If authentication is successful, the transmitting device 116 can provide the data 128 to the receiving device 120. If the authentication is not successful, the transmitting device 116 may elect not to provide the data 128 to the receiving device 120.

It should be understood that the phrases "transmitting device" and "receiving device" are merely illustrative of one example embodiment, and refer to the transmitting of and/or receiving of the data 128. In some embodiments, the transmitting device 116 can correspond to a secure server, and the receiving device 120 can correspond to a gateway that maintains an only existing communication channel with the secure server. Because other devices can use the concepts and technologies disclosed herein, it should be understood that these examples are illustrative, and therefore should not be construed as being limiting in any way.

FIG. 1 illustrates one server computer 102, one network 104, one transmitting device 116, one receiving device 120, and one authentication service 126. It should be understood, however, that various implementations of the operating environment 100 can include one or more than one server computer 102, one or more than one network 104, one or more than one transmitting device 116, one or more than one receiving device 120, and zero, one, or more than one authentication service 126. As such, the illustrated embodiment should be understood as being illustrative, and should not be construed as being limiting in any way.

Figure 2:
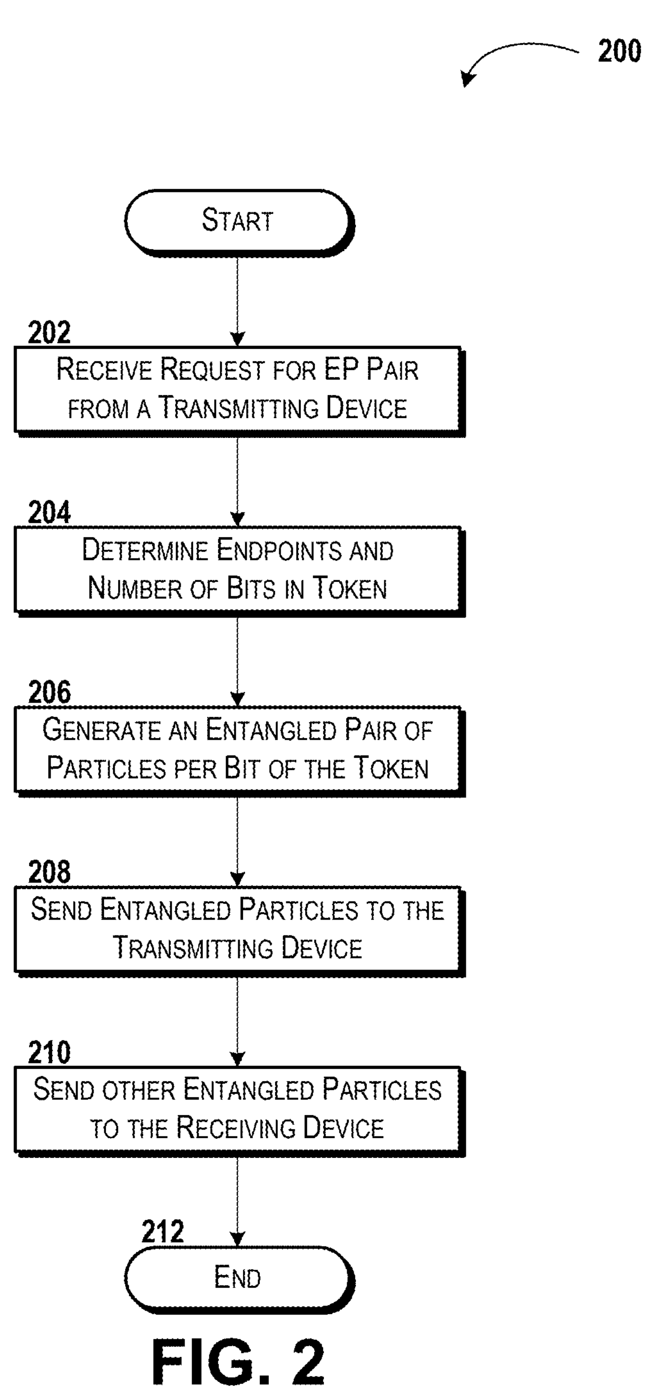
FIG. 2 is a flow diagram showing aspects of a method for authenticating a receiving device using a token and entangled particles, according to an illustrative embodiment of the concepts and technologies described herein.

Turning now to FIG. 2, aspects of a method 200 for enabling a quantum entanglement communication link between two devices will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the server computer 102, the transmitting device 116, and/or the receiving device 120, to perform one or more operations and/or causing the processor to direct other components of the computing system or device to perform one or more of the operations.

For purposes of illustrating and describing the concepts of the present disclosure, the method 200 is described herein as being performed by the server computer 102 via execution of one or more software modules such as, for example, the quantum entanglement communication service 106. It should be understood that additional and/or alternative devices and/or network nodes can provide the functionality described herein via execution of one or more modules, applications, and/or other software including, but not limited to, the quantum entanglement communication service 106. Thus, the illustrated embodiments are illustrative, and should not be viewed as being limiting in any way.

The method 200 begins at operation 202. At operation 202, the server computer 102 can receive a request 114 for an entangled particle pair 110 from a transmitting device 116. As explained above, the request 114 can be generated by a transmitting device 116 for each bit of a token 124 that is to be "transmitted," or more accurately "communicated" to the transmitting device 116 from the receiving device 120 according to embodiments of the concepts and technologies disclosed herein. As explained above, the request 114 generated in operation 202 can, in some embodiments, specify a number of entangled particle pairs 110 to generate and/or a number of bits in the token 124, which can be the same number. In some other embodiments, a new request 114 can be generated for each bit in the token 124. As such, the illustrated embodiment is illustrative and should not be construed as being limiting in any way.

From operation 202, the method 200 can proceed to operation 204. At operation 204, the server computer 102 can determine the endpoints for the communications link associated with the request 114 received in operation 202, as well as a number of bits in a token 124 associated with the request 114. As explained above, the request 114 can specify, in some embodiments, the transmitting device 116 and the receiving device 120, which can be identified by one or more device identifiers (e.g., an IMSI, an IMEI, a SUPI, a MAC ID, etc.), network identifiers (e.g., an IP address, a network ID, etc.), user information (e.g., account information, user ID, etc.), or other identifiers. Similarly, the request 114 can specify a number of bits in the token 124, which may be known to the transmitting device 116 and/or the receiving device 120. Thus, operation 204 can correspond to the server computer 102 determining, from the request 114 or information associated with the request 114, the transmitting device 116 and the receiving device 120 and a number of bits in the token 124. Because the transmitting device 116 and the receiving device 120 can be determined in additional and/or alternative manners, and because the number of bits in the token 124 can also be determined in additional and/or alternative manners, it should be understood that these examples are illustrative, and therefore should not be construed as being limiting in any way.

From operation 204, the method 200 can proceed to operation 206. At operation 206, the server computer 102 can generate an entangled particle pair 110 per bit of the token 124. According to various embodiments of the concepts and technologies disclosed herein, the server computer 102 can trigger generation of a number of entangled particle pairs 110, where the number can correspond to a number of bits in the token 124. As explained above, the server computer 102 can include an entangled particle generator 108, so operation 206 can correspond to the server computer 102 triggering generation of the one or more entangled particle pairs 110 by the entangled particle generator 108. It should be understood that this example is illustrative, and therefore should not be construed as being limiting in any way.

From operation 206, the method 200 can proceed to operation 208. At operation 208, the server computer 102 can send the entangled particles 112A from the entangled particle pairs 110 to the transmitting device 116. From operation 208, the method 200 can proceed to operation 210. At operation 210, the server computer 102 can send the other entangled particles 112B from the entangled particle pairs 110 to the receiving device 120.

As such, it can be appreciated that the server computer 102 can be entirely unaware of the token 124, the data 128, and/or any single bit corresponding to the token 124 and/or the data 128 when the entangled particle pairs 110 are generated. As such, the server computer 102 can handle communication of the entangled particles 112A, 112B without any knowledge of the token 124, the data 128, and/or bits thereof, which in some implementations can enhance security of the embodiments of the concepts and technologies disclosed herein. It should be understood that this example is illustrative, and therefore should not be construed as being limiting in any way.

From operation 210, the method 200 can proceed to operation 212. The method 200 can end at operation 212.

Figure 3:
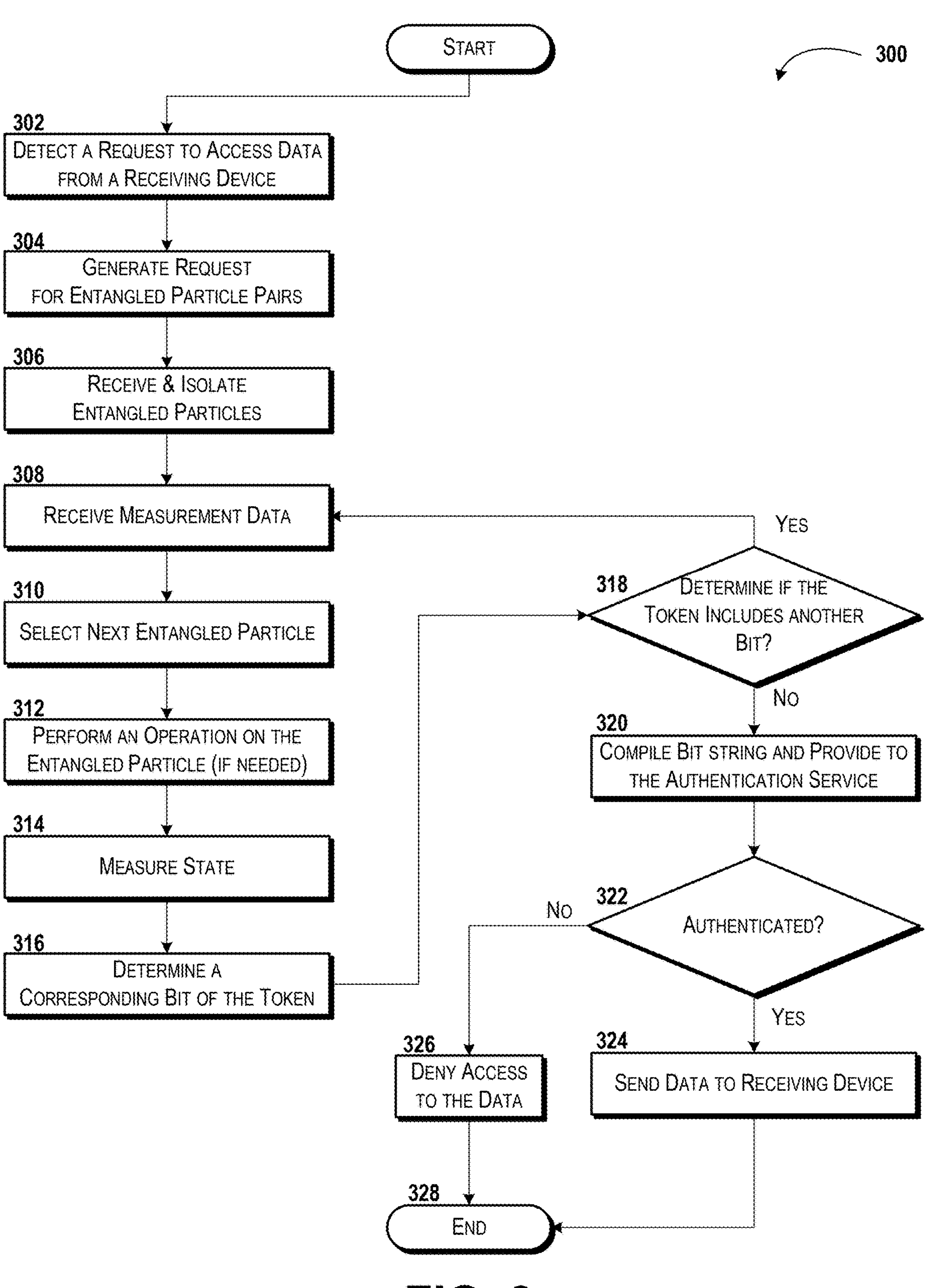
FIG. 3 is a flow diagram showing aspects of a method for transmitting data using a quantum entanglement communication link, according to an illustrative embodiment of the concepts and technologies described herein.

Turning now to FIG. 3, aspects of a method 300 for authenticating a receiving device 120 using a token 124 and entangled particles 112A, 112B will be described in detail, according to an illustrative embodiment. For purposes of illustrating and describing the concepts of the present disclosure, the method 300 is described herein as being performed by the transmitting device 116 via execution of one or more software modules such as, for example, the quantum entanglement communication application 118. It should be understood that additional and/or alternative devices and/or network nodes can provide the functionality described herein via execution of one or more modules, applications, and/or other software including, but not limited to, the quantum entanglement communication application 118. Thus, the illustrated embodiments are illustrative, and should not be viewed as being limiting in any way.

Although not separately shown in FIG. 3, it should be understood that the transmitting device 116 can be configured to establish a communications link with the receiving device 120 at one or more of various times in the method flow illustrated in FIG. 3. It should be understood that the establishment of the communications link can occur at any time before transmission of the measurement data 132 occurs. As such, it can be appreciated that the communications link can be established before operation 302, before operation 316, and/or at other times. Furthermore, it should be understood that the communications link can persist during the communications between the transmitting device 116 and the receiving device 120, or that the communications link can be established and release each time the measurement data 132 is transmitted. It should be understood that these examples are illustrative, and therefore should not be construed as being limiting in any way.

The method 300 can begin at operation 302. At operation 302, the transmitting device 116 can detect a request for the data 128 stored at the transmitting device 116. In some embodiments, for example, the transmitting device 116 can receive the data access request 130 from the receiving device 120. Because the request for the data 128 can be received in additional and/or alternative manners, it should be understood that this example is illustrative, and therefore should not be construed as being limiting in any way.

From operation 302, the method 300 can proceed to operation 304. At operation 304, the transmitting device 116 can generate a request for one or more entangled particle pairs 110. In some embodiments, the request generated in operation 304 can correspond to the request 114 illustrated and described herein. Thus, it can be understood that operation 304 (or other operation) can also include the transmitting device 116 determining a number of bits in the token 124 that will be used by the receiving device 120 to authenticate with the transmitting device 116 (in order to obtain the data 128). In some embodiments, as noted above, the request 114 can identify endpoints associated with the request 114.

In the example illustrated in FIG. 1, the endpoints can correspond to the transmitting device 116 and the receiving device 120. In some embodiments, the data access request 130 can identify the number of bits in the token 124. In some other embodiments, the request 114 does not indicate the number of bits in the token 124, as explained above. For simplicity, the embodiment wherein the number of bits of the token 124 is known will be described. In light of the above, however, it should be understood that this example is illustrative, and therefore should not be construed as being limiting in any way.

From operation 304, the method 300 can proceed to operation 306. At operation 306, the transmitting device 116 can receive one or more entangled particles 112A from the server computer 102. Operation 306 also can include the transmitting device 116 isolating the entangled particles 112A to ensure that the entanglement between the entangled particles 112A and the entangled particles 112B is maintained. In particular, as is generally known, any measurement and/or observation of the entangled particles 112A can break the entanglement between the entangled particles 112A and the entangled particles 112B, so the entangled particles 112A can be isolated from measurement and/or observation of the entangled particles 112A. The entangled particles 112A can be stored in order by the transmitting device 116, as explained above. It should be understood that this example is illustrative, and therefore should not be construed as being limiting in any way.

From operation 306, the method 300 can proceed to operation 308. At operation 308, the transmitting device 116 can receive measurement data 132 from the receiving device 120. As noted above, the measurement data 132 can indicate a measurement observed at the receiving device 120 after interacting with an entangled particle 112B with a bit of the token 124. Thus, the measurement data 132 can indicate the measurement as 00, 01, 10, or 11. It should be understood that this example is illustrative, and therefore should not be construed as being limiting in any way.

From operation 308, the method 300 can proceed to operation 310. At operation 310, the transmitting device 116 can select a next (or first in the first iteration of operation 310) entangled particle 112A. As noted above, the entangled particles 112A can be stored by the transmitting device 116 in order, in some embodiments, and therefore can be selected in order by the transmitting device 116. It should be understood that this example is illustrative, and therefore should not be construed as being limiting in any way.

From operation 310, the method 300 can proceed to operation 312. At operation 312, the transmitting device 116 can perform an operation on the selected entangled particle 112A. It can be appreciated that operation 312 also can include the transmitting device 116 determining the operation to perform on the entangled particle 112A. In particular, if the measurement data 132 indicates that the measurement 00 was observed (e.g., measured) at the receiving device 120, the transmitting device 116 can be configured to take no action on its corresponding entangled particle 112A. If the measurement data 132 indicates that the measurement 01 was observed (e.g., measured) at the receiving device 120, the transmitting device 116 can be configured to perform an X gate operation on its corresponding entangled particle 112A. If the measurement data 132 indicates that the measurement 10 was observed (e.g., measured) at the receiving device 120, the transmitting device 116 can be configured to perform a Z gate operation on its corresponding entangled particle 112A. If the measurement data 132 indicates that the measurement 11 was observed (e.g., measured) at the receiving device 120, the transmitting device 116 can be configured to perform an X gate operation and a Z gate operation on its corresponding entangled particle 112A. Thus, operation 312 can include determining the operation to perform on the entangled particle 112A, as well as performing the operation on the entangled particle 112A. It should be understood that this example is illustrative, and therefore should not be construed as being limiting in any way.

From operation 312, the method 300 can proceed to operation 314. At operation 314, the transmitting device 116 can measure the state of the entangled particle 112A after the operation in operation 312 is performed on the entangled particle 112A (or after no operation is performed in the case of a 00 measurement at the receiving device 120 as noted above). The measured state of the entangled particle can be a 0 or a 1, as explained above.

From operation 314, the method 300 can proceed to operation 316. At operation 316, the transmitting device 116 can determine a corresponding bit of the token 124. The value of the bit of the token 124 will be the measured state of the entangled particle 112A, and therefore will be a 0 or a 1.

From operation 316, the method 300 can proceed to operation 318. At operation 316, the transmitting device 116 can determine if the token 124 includes another bit (e.g., if any additional bits of the token 124 remain to be represented). As noted above, the transmitting device 116 can be aware of the number of bits in the token 124, in some embodiments. In some other embodiments, the transmitting device 116 can determine the number of bits of the token 124 based on the data access request 130. In yet other embodiments, the transmitting device 116 may determine that additional bits of the token 124 remain if another instance of measurement data 132 is received. Because the determination of operation 318 as to whether additional bits of the token 124 remain can be made in additional and/or alternative manners, it should be understood that these examples are illustrative, and therefore should not be construed as being limiting in any way.

If the transmitting device 116 determines, in any iteration of operation 318, that the token 124 includes another bit (e.g., if any additional bits of the token 124 remain to be represented), the method 300 can return to operation 308, where another instance of measurement data 132 can be received. Operations 308-318 can be iterated until the transmitting device 116 determines, in any iteration of operation 318, that the token 124 does not include another bit (e.g., that no additional bits of the token 124 remain to be represented).

If the transmitting device 116 determines, in any iteration of operation 318, that the token 124 does not include another bit (e.g., that no additional bits of the token 124 remain to be represented), the method 300 can proceed to operation 320. At operation 320, the transmitting device 116 can compile, construct, or assemble the bits determined in the one or more iterations of operation 316, and can output a bit string. In some embodiments, the transmitting device 116 can provide the bit string to the authentication service 126. It can be appreciated that the bit string compiled in operation 320 can be identical to the token 124 stored at the receiving device 120, as the bits of the bit string and the token 124 can be identical. Thus, FIG. 1 shows the token 124 existing on the transmitting device 116, but it can be appreciated from the illustrated and described embodiments herein that the token 124 is not actually transmitted from the receiving device 120 to the transmitting device 116. Rather, as noted above, the box labeled "token 124" at the transmitting device 116 can correspond to the bit string. It should be understood that this example is illustrative, and therefore should not be construed as being limiting in any way.

From operation 320, the method 300 can proceed to operation 322. At operation 322, the transmitting device 116 can determine if the authentication service 126 has authenticated the bit string that corresponds to the token 124. It can be appreciated that the authentication service 126 can issue an authentication decision in any number of manners such as, for example, a yes/no decision; a true/false decision; an allow/deny decision; and/or other binary and/or non-binary decisions. Because the determination of operation 322 as to whether authentication has been successful can be made in additional and/or alternative manners, it should be understood that the illustrated embodiment is illustrative and should not be construed as being limiting in any way.

If the transmitting device 116 determines, in operation 322, that the authentication service 126 has authenticated the bit string that corresponds to the token 124, the method 300 can return to operation 324. In operation 324, the transmitting device 116 can transmit the data 128 to the receiving device 120. Thus, it can be appreciated that the receiving device 120 will have authenticated with the transmitting device 116 using a token 124, without ever transmitting even one bit of the token 124 to the transmitting device 116. It should be understood that this example is illustrative, and therefore should not be construed as being limiting in any way.

If the transmitting device 116 determines, in operation 322, that the authentication service 126 has not authenticated the bit string that corresponds to the token 124, the method 300 can return to operation 326. In operation 326, the transmitting device 116 can block or deny access to the data 128 by the receiving device 120. Thus, it can be appreciated that the receiving device 120 will have failed to authenticate with the transmitting device 116 using a token 124, without ever transmitting even one bit of the token 124 to the transmitting device 116. The receiving device may again request the data and the attempt to authenticate can be iterated, if desired. It should be understood that this example is illustrative, and therefore should not be construed as being limiting in any way.

From operation 326, the method 300 can proceed to operation 328. The method 300 also can proceed to operation 328 from operation 324. The method 300 can end at operation 328.

Figure 4:
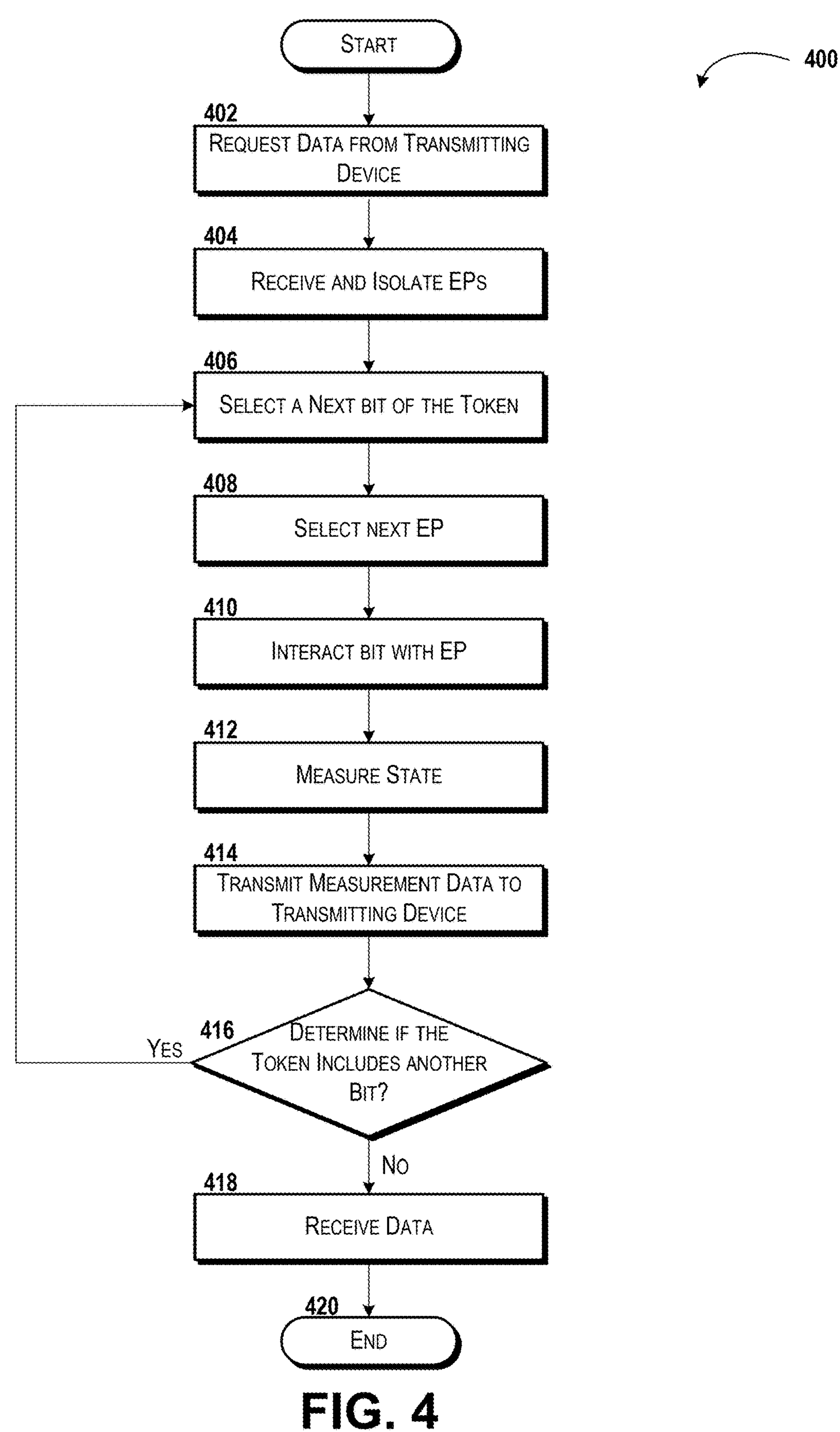
FIG. 4 is a flow diagram showing aspects of a method for receiving data using a quantum entanglement communication link, according to an illustrative embodiment of the concepts and technologies described herein.

Turning now to FIG. 4, aspects of a method 400 for authenticating with a transmitting device using a token and entangled particles will be described in detail, according to an illustrative embodiment. For purposes of illustrating and describing the concepts of the present disclosure, the method 400 is described herein as being performed by the receiving device 120 via execution of one or more software modules such as, for example, the quantum entanglement communication application 118. It should be understood that additional and/or alternative devices and/or network nodes can provide the functionality described herein via execution of one or more modules, applications, and/or other software including, but not limited to, the quantum entanglement communication application 118. Thus, the illustrated embodiments are illustrative, and should not be viewed as being limiting in any way.

The method 400 begins at operation 402. At operation 402, the receiving device 120 can request data 128 from a transmitting device 116. In various embodiments of the concepts and technologies disclosed herein, the receiving device 120 can perform the functionality of operation 402 by generating a data access request 130. As noted above, the data 128 can be any information in any format including files, streaming data, etc., that the transmitting device 116 is to transmit and/or provide to the receiving device 120. According to various embodiments, however, the data 128 can be sensitive or even super-sensitive data that will only be provided to properly authenticated entities. Because the concepts and technologies disclosed herein can be used to authenticate devices for any type of data, however, it should be understood that this example is illustrative, and therefore should not be construed as being limiting in any way.

From operation 402, the method 400 can proceed to operation 404. At operation 404, the receiving device 120 can receive one or more entangled particles 112B from the server computer 102. Operation 406 also can include the receiving device 120 isolating the entangled particles 112B to ensure that the entanglement between the entangled particles 112B and the entangled particles 112A is maintained as explained herein. If more than one entangled particle 112B is received in operation 404, the more than one entangled particles 112B can be stored in order by the receiving device 120, as explained above. It should be understood that this example is illustrative, and therefore should not be construed as being limiting in any way.

From operation 404, the method 400 can proceed to operation 406. At operation 406, the receiving device 120 can select a next (or first if the first iteration of operation 406) bit of the token 124 stored at the receiving device 120. In the example shown in FIG. 1, a first bit of the token 124 can be a 0, a second bit of the token can be a 1, etc. It should be understood that this example is illustrative, and therefore should not be construed as being limiting in any way.

From operation 406, the method 400 can proceed to operation 408. At operation 408, the receiving device 120 can select a next (or first if the first iteration of operation 408) entangled particle 112B. As noted above, the entangled particles 112B can be stored by the receiving device 120 in order, in some embodiments, and therefore can be selected in order by the receiving device 120. It should be understood that this example is illustrative, and therefore should not be construed as being limiting in any way.

From operation 408, the method 400 can proceed to operation 410. At operation 410, the receiving device 120 can interact the selected bit of the token 124 with the selected entangled particle 112B. From operation 410, the method 400 can proceed to operation 412. At operation 412, the receiving device 120 can measure a state of the system existing after interacting the selected bit of the token 124 with the selected entangled particle 112B. As noted above, the measurement observed in operation 412 can have two bits (since one bit of the token 124 having a value of 0 or 1 was interacted with an entangled particle 112B, the measurement of which would have a single state value of 0 or 1). Thus, the state measured in operation 412 will be one of 00, 01, 10, or 11. This state can be measured by the receiving device 120 in operation 412.

From operation 412, the method 400 can proceed to operation 414. At operation 414, the receiving device 120 can generate and transmit measurement data 132 to the transmitting device 116. As explained herein, the measurement data 132 can indicate a value of 00, 01, 10, or 11. In some embodiments, the measurement data 132 also can indicate if additional bits of the token 124 remain. Thus, operation 414 can include the receiving device 120 generating the measurement data 132 and sending the measurement data 132 to the transmitting device 116. It should be understood that the measurement data 132 must be transmitted no faster than the speed of light, and that the measurement data must be transmitted to the transmitting device 116 to maintain consistency with the laws of quantum mechanics. It should be understood that this example is illustrative, and therefore should not be construed as being limiting in any way.

From operation 414, the method 400 can proceed to operation 416. At operation 416, the receiving device 120 can determine if the token 124 includes another bit (e.g., if any additional bits of the token 124 remain to be represented). As noted above, the receiving device 120 can store the token 124 and therefore be aware of the number of bits in the token 124, in some embodiments. Because the determination of operation 416 as to whether additional bits of the token 124 remain can be made in additional and/or alternative manners, it should be understood that these examples are illustrative, and therefore should not be construed as being limiting in any way.

If the receiving device 120 determines, in any iteration of operation 416, that the token 124 includes another bit (e.g., if any additional bits of the token 124 remain to be represented), the method 400 can return to operation 406, where a next bit of the token 124 can be selected. Operations 406-416 can be iterated until the receiving device 120 determines, in any iteration of operation 416, that the token 124 does not include another bit (e.g., that no additional bits of the token 124 remain to be represented).

If the receiving device 120 determines, in any iteration of operation 416, that the token 124 does not include another bit (e.g., that no additional bits of the token 124 remain to be represented), the method 400 can proceed to operation 418. At operation 418, the receiving device 120 can receive the data 128 (e.g., the data requested in operation 402). It should be understood that a pause may occur between operations 416 and 418 (e.g., while the transmitting device 116 authenticates the bit string generated at the transmitting device 116 and then transmits the data 128 to the receiving device 120). It should be understood that this example is illustrative, and therefore should not be construed as being limiting in any way.

From operation 418, the method 400 can proceed to operation 420. The method 400 can end at operation 420.

Figure 5:
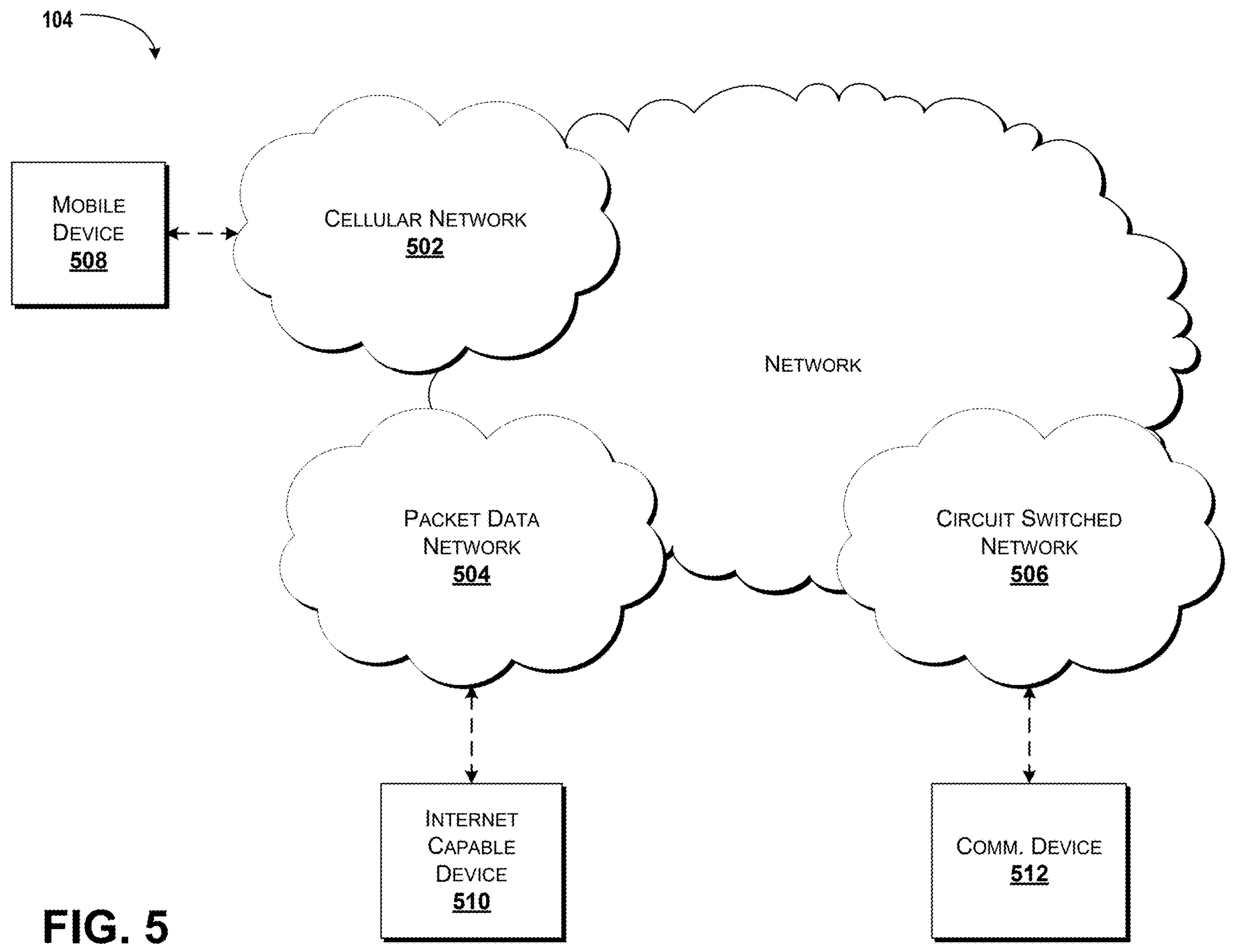
FIG. 5 schematically illustrates a network, according to an illustrative embodiment of the concepts and technologies described herein.

Turning now to FIG. 5, additional details of the network 104 are illustrated, according to an illustrative embodiment. The network 104 includes a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSUPA), and HSPA+. The cellular network 502 also is compatible with 4G, 4.5G, and 5G mobile communications standards as well as evolved and future mobile standards.

The packet data network 504 includes various devices, for example, servers, computers, databases, and other devices in communication with one another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network 104 is used to refer broadly to any combination of the networks 502, 504, 506. It should be appreciated that substantially all of the functionality described with reference to the network 104 can be performed by the cellular network 502, the packet data network 504, and/or the circuit switched network 506, alone or in combination with other networks, network elements, and the like.

Figure 6:
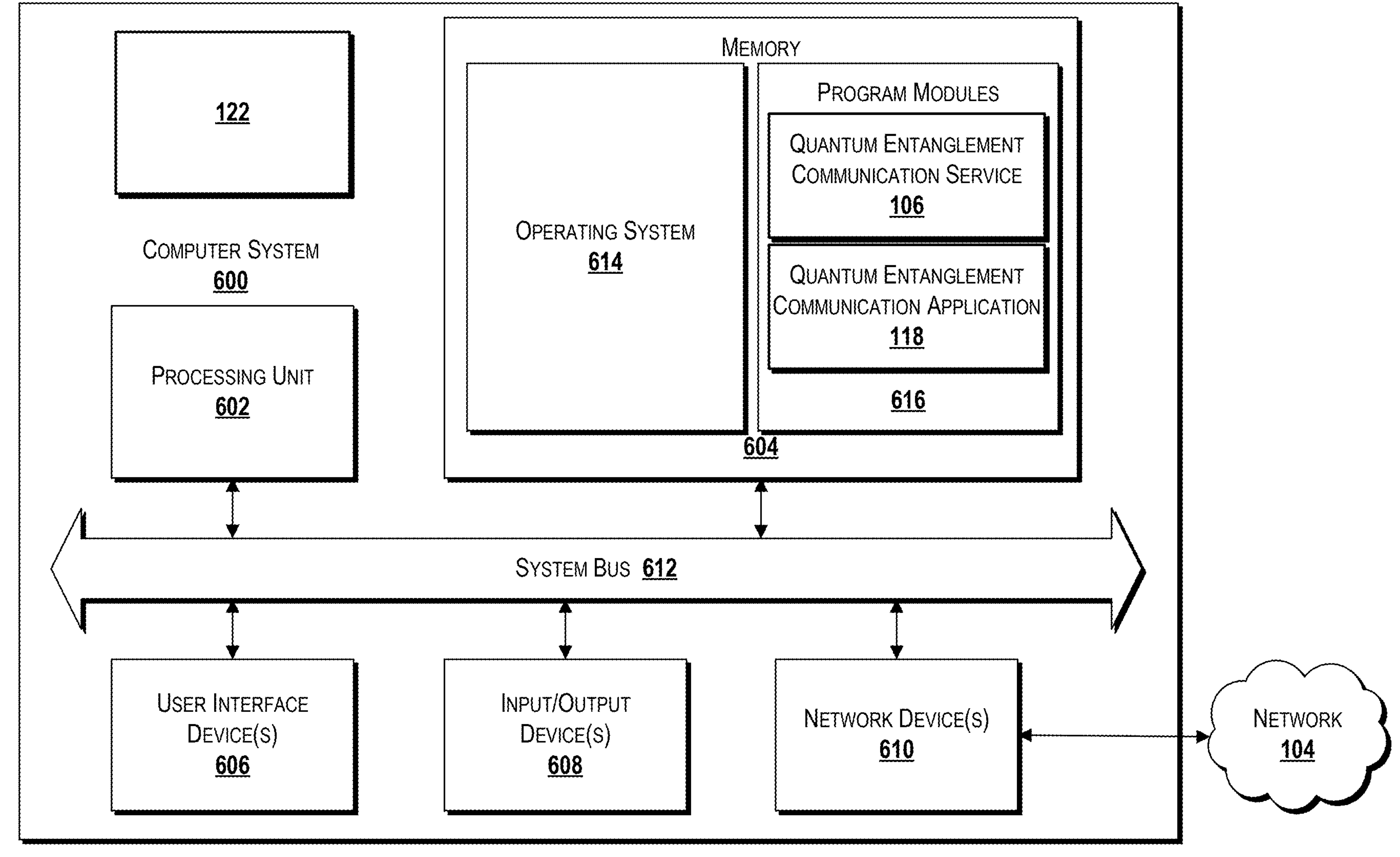
FIG. 6 is a block diagram illustrating an example computer system configured to provide a quantum entanglement communication service, according to some illustrative embodiments of the concepts and technologies described herein.

FIG. 6 is a block diagram illustrating a computer system 600 configured to provide the functionality described herein for providing a quantum entanglement communication service, in accordance with various embodiments of the concepts and technologies disclosed herein. Thus, the server computer 102, the transmitting device 116, the receiving device 120, and/or a device that hosts the authentication service 126 can have an architecture similar or even identical to the computer system 600. The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 616 may include various software and/or program modules described herein. In some embodiments, for example, the program modules 616 include the quantum entanglement communication service 106, the quantum entanglement communication application 118, and/or the authentication service 126. These and/or other programs can be embodied in computer-readable media containing instructions that, when executed by the processing unit 602, perform one or more of the methods 200, 300, and/or 400 described in detail above with respect to FIGS. 2-4 and/or other functionality as illustrated and described herein. It can be appreciated that, at least by virtue of the instructions embodying the methods 200, 300, and/or 400, and/or other functionality illustrated and described herein being stored in the memory 604 and/or accessed and/or executed by the processing unit 602, the computer system 600 is a special-purpose computing system that can facilitate providing the functionality illustrated and described herein. According to embodiments, the program modules 616 may be embodied in hardware, software, firmware, or any combination thereof. Although not shown in FIG. 6, it should be understood that the memory 604 also can be configured to store the request 114, the token 124, the data 128, the data access request 130, the measurement data 132, and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes only non-transitory embodiments of computer readable media as illustrated and described herein. Thus, computer storage media can include volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof does not include waves or signals per se and/or communication media.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the network 104. Examples of the network devices 610 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such as a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

As shown in FIG. 6, the computer system 600 also can include the entangled particle isolation and measurement hardware 122 illustrated and described herein. As such, it should be understood that the computer system 600 can include a quantum memory, a quantum processor, Hadamard gates, and/or other hardware as illustrated and described herein. As such, it can be appreciated that the computer system 600 can function as the transmitting device 116 and/or the receiving device 120 in some embodiments. It should be understood that this example is illustrative, and therefore should not be construed as being limiting in any way.

Figure 7:
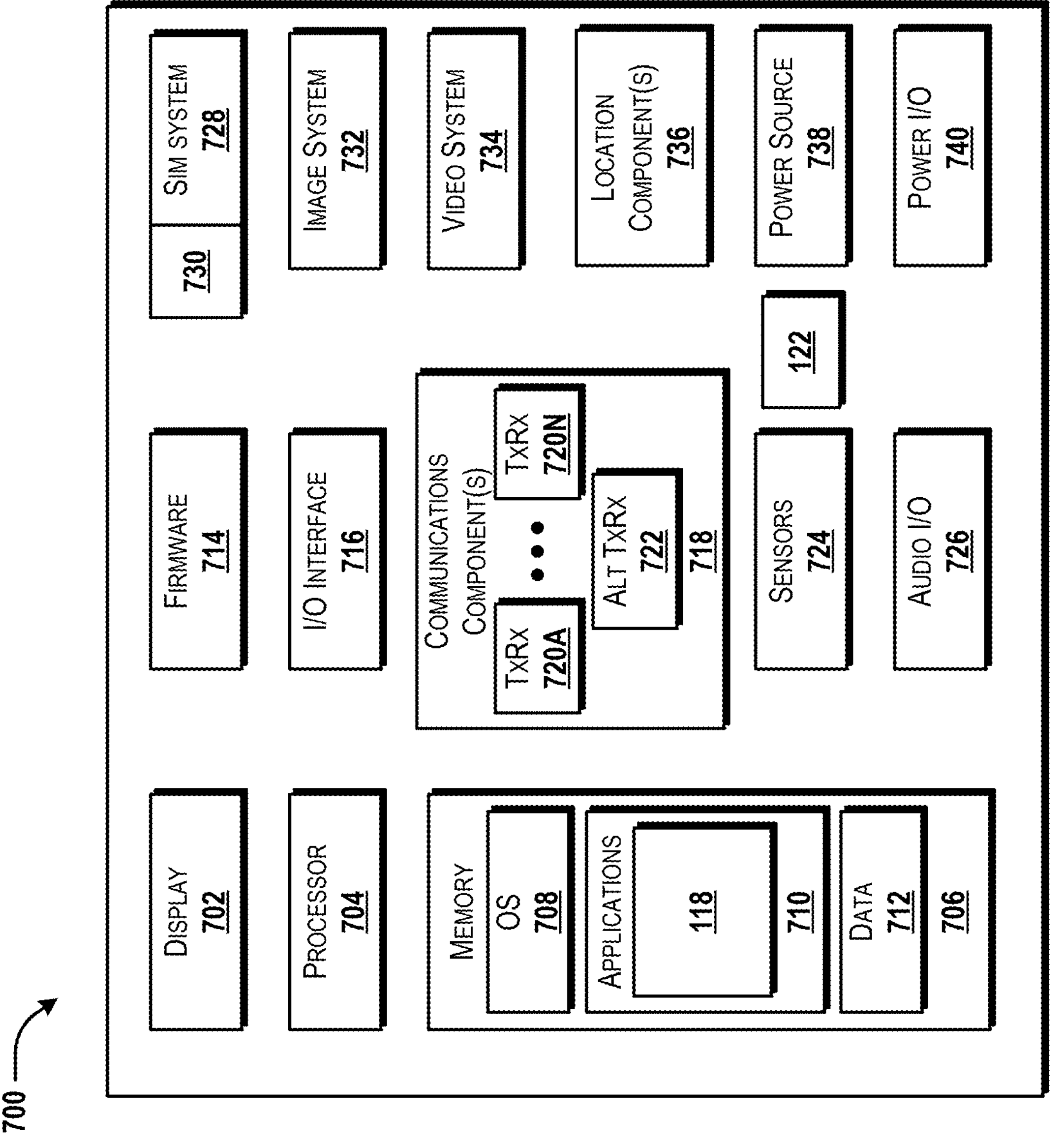
FIG. 7 is a block diagram illustrating an example mobile device configured to interact with a quantum entanglement communication service, according to some illustrative embodiments of the concepts and technologies described herein.

Turning now to FIG. 7, an illustrative mobile device 700 and components thereof will be described. In some embodiments, the transmitting device 116 and/or the receiving device 120 illustrated and described above with reference to FIGS. 1-6 can be configured as and/or can have an architecture similar or identical to the mobile device 700 described herein in FIG. 7. It should be understood, however, that the transmitting device 116 and/or the receiving device 120 may or may not include the functionality described herein with reference to FIG. 7. While connections are not shown between the various components illustrated in FIG. 7, it should be understood that some, none, or all of the components illustrated in FIG. 7 can be configured to interact with one another to carry out various device functions. In some embodiments, the components are arranged so as to communicate via one or more busses (not shown). Thus, it should be understood that FIG. 7 and the following description are intended to provide a general understanding of a suitable environment in which various aspects of embodiments can be implemented, and should not be construed as being limiting in any way.

As illustrated in FIG. 7, the mobile device 700 can include a display 702 for displaying data. According to various embodiments, the display 702 can be configured to display various graphical user interface ("GUI") elements such as, for example, text, images, video, virtual keypads and/or keyboards, messaging data, notification messages, metadata, internet content, device status, time, date, calendar data, device preferences, map and location data, combinations thereof, and/or the like. The mobile device 700 also can include a processor 704 and a memory or other data storage device ("memory") 706. The processor 704 can be configured to process data and/or can execute computer-executable instructions stored in the memory 706. The computer-executable instructions executed by the processor 704 can include, for example, an operating system 708, one or more applications 710 such as the quantum entanglement communication application 118 and/or other computer-executable instructions stored in a memory 706, or the like. In some embodiments, the applications 710 also can include a UI application (not illustrated in FIG. 7).

The UI application can interface with the operating system 708 to facilitate user interaction with functionality and/or data stored at the mobile device 700 and/or stored elsewhere. In some embodiments, the operating system 708 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 704 to aid a user in entering content, configuring settings, manipulating address book content and/or settings, multimode interaction, interacting with other applications 710, and otherwise facilitating user interaction with the operating system 708, the applications 710, and/or other types or instances of data 712 that can be stored at the mobile device 700. The data 712 can include, for example, the token 124, the data 128, the data access request 130, the measurement data 132, and/or other information. According to various embodiments, the data 712 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 710, the data 712, and/or portions thereof can be stored in the memory 706 and/or in a firmware 714, and can be executed by the processor 704.

It can be appreciated that, at least by virtue of storage of the instructions corresponding to the applications 710 and/or other instructions embodying other functionality illustrated and described herein in the memory 706, and/or by virtue of the instructions corresponding to the applications 710 and/or other instructions embodying other functionality illustrated and described herein being accessed and/or executed by the processor 704, the mobile device 700 is a special-purpose mobile device that can facilitate providing the functionality illustrated and described herein. The firmware 714 also can store code for execution during device power up and power down operations. It can be appreciated that the firmware 714 can be stored in a volatile or non-volatile data storage device including, but not limited to, the memory 706 and/or a portion thereof.

The mobile device 700 also can include an input/output ("I/O") interface 716. The I/O interface 716 can be configured to support the input/output of data such as location information, user information, organization information, presence status information, user IDs, passwords, and application initiation (start-up) requests. In some embodiments, the I/O interface 716 can include a hardwire connection such as a universal serial bus ("USB") port, a mini-USB port, a micro-USB port, an audio jack, a PS2 port, an IEEE 1394

("FIREWIRE") port, a serial port, a parallel port, an Ethernet (RJ45 or RJ48) port, a telephone (RJ11 or the like) port, a proprietary port, combinations thereof, or the like. In some embodiments, the mobile device 700 can be configured to synchronize with another device to transfer content to and/or from the mobile device 700. In some embodiments, the mobile device 700 can be configured to receive updates to one or more of the applications 710 via the I/O interface 716, though this is not necessarily the case. In some embodiments, the I/O interface 716 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 716 may be used for communications between the mobile device 700 and a network device or local device.

The mobile device 700 also can include a communications component 718. The communications component 718 can be configured to interface with the processor 704 to facilitate wired and/or wireless communications with one or more networks such as the network 104 described herein. In some embodiments, other networks include networks that utilize non-cellular wireless technologies such as WI-FI or WIMAX. In some embodiments, the communications component 718 includes a multimode communications subsystem for facilitating communications via the cellular network and one or more other networks.

The communications component 718, in some embodiments, includes one or more transceivers. The one or more transceivers, if included, can be configured to communicate over the same and/or different wireless technology standards with respect to one another. For example, in some embodiments one or more of the transceivers of the communications component 718 may be configured to communicate using GSM, CDMAONE, CDMA2000, LTE, and various other 2G, 2.5G, 3G, 4G, and greater generation technology standards. Moreover, the communications component 718 may facilitate communications over various channel access methods (which may or may not be used by the aforementioned standards) including, but not limited to, TDMA, FDMA, W-CDMA, OFDM, SDMA, and the like.

In addition, the communications component 718 may facilitate data communications using GPRS, EDGE, the HSPA protocol family including HSDPA, EUL or otherwise termed HSUPA, HSPA+, and various other current and future wireless data access standards. In the illustrated embodiment, the communications component 718 can include a first transceiver ("TxRx") 720A that can operate in a first communications mode (e.g., GSM). The communications component 718 also can include an N$^{th}$ transceiver ("TxRx") 720N that can operate in a second communications mode relative to the first transceiver 720A (e.g., UMTS). While two transceivers 720A-N (hereinafter collectively and/or generically referred to as "transceivers 720") are shown in FIG. 7, it should be appreciated that less than two, two, and/or more than two transceivers 720 can be included in the communications component 718.

The communications component 718 also can include an alternative transceiver ("Alt TxRx") 722 for supporting other types and/or standards of communications. According to various contemplated embodiments, the alternative transceiver 722 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 718 also can facilitate reception from terrestrial radio networks, digital satellite radio networks, internet-based radio service networks, combinations thereof, and the like. The communications component 718 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 700 also can include one or more sensors 724. The sensors 724 can include temperature sensors, light sensors, air quality sensors, movement sensors, orientation sensors, noise sensors, proximity sensors, or the like. As such, it should be understood that the sensors 724 can include, but are not limited to, accelerometers, magnetometers, gyroscopes, infrared sensors, noise sensors, microphones, combinations thereof, or the like. Additionally, audio capabilities for the mobile device 700 may be provided by an audio I/O component 726. The audio I/O component 726 of the mobile device 700 can include one or more speakers for the output of audio signals, one or more microphones for the collection and/or input of audio signals, and/or other audio input and/or output devices.

The illustrated mobile device 700 also can include a subscriber identity module ("SIM") system 728. The SIM system 728 can include a universal SIM ("USIM"), a universal integrated circuit card ("UICC") and/or other identity devices. The SIM system 728 can include and/or can be connected to or inserted into an interface such as a slot interface 730. In some embodiments, the slot interface 730 can be configured to accept insertion of other identity cards or modules for accessing various types of networks. Additionally, or alternatively, the slot interface 730 can be configured to accept multiple subscriber identity cards. Because other devices and/or modules for identifying users and/or the mobile device 700 are contemplated, it should be understood that these embodiments are illustrative, and should not be construed as being limiting in any way.

The mobile device 700 also can include an image capture and processing system 732 ("image system"). The image system 732 can be configured to capture or otherwise obtain photos, videos, and/or other visual information. As such, the image system 732 can include cameras, lenses, charge-coupled devices ("CCDs"), combinations thereof, or the like. The mobile device 700 may also include a video system 734. The video system 734 can be configured to capture, process, record, modify, and/or store video content. Photos and videos obtained using the image system 732 and the video system 734, respectively, may be added as message content to an MMS message, email message, and sent to another mobile device. The video and/or photo content also can be shared with other devices via various types of data transfers via wired and/or wireless communication devices as described herein.

The mobile device 700 also can include one or more location components 736. The location components 736 can be configured to send and/or receive signals to determine a geographic location of the mobile device 700. According to various embodiments, the location components 736 can send and/or receive signals from global positioning system ("GPS") devices, assisted-GPS ("A-GPS") devices, WI-FI/WIMAX and/or cellular network triangulation data, combinations thereof, and the like. The location component 736 also can be configured to communicate with the communications component 718 to retrieve triangulation data for determining a location of the mobile device 700. In some embodiments, the location component 736 can interface with cellular network nodes, telephone lines, satellites, location transmitters and/or beacons, wireless network transmitters and receivers, combinations thereof, and the like. In some embodiments, the location component 736 can include and/or can communicate with one or more of the sensors 724 such as a compass, an accelerometer, and/or a gyroscope to determine the orientation of the mobile device 700. Using the location component 736, the mobile device 700 can generate and/or receive data to identify its geographic location, or to transmit data used by other devices to determine the location of the mobile device 700. The location component 736 may include multiple components for determining the location and/or orientation of the mobile device 700.

The illustrated mobile device 700 also can include a power source 738. The power source 738 can include one or more batteries, power supplies, power cells, and/or other power subsystems including alternating current ("AC") and/or direct current ("DC") power devices. The power source 738 also can interface with an external power system or charging equipment via a power I/O component 740. Because the mobile device 700 can include additional and/or alternative components, the above embodiment should be understood as being illustrative of one possible operating environment for various embodiments of the concepts and technologies described herein. The described embodiment of the mobile device 700 is illustrative, and should not be construed as being limiting in any way.

As shown in FIG. 7, the mobile device 700 also can include the entangled particle isolation and measurement hardware 122 illustrated and described herein. As such, it should be understood that the mobile device 700 can include a quantum memory, a quantum processor, Hadamard gates, and/or other hardware as illustrated and described herein. As such, it can be appreciated that the mobile device 700 can function as the transmitting device 116 and/or the receiving device 120 in some embodiments. It should be understood that this example is illustrative, and therefore should not be construed as being limiting in any way.

Figure 8:
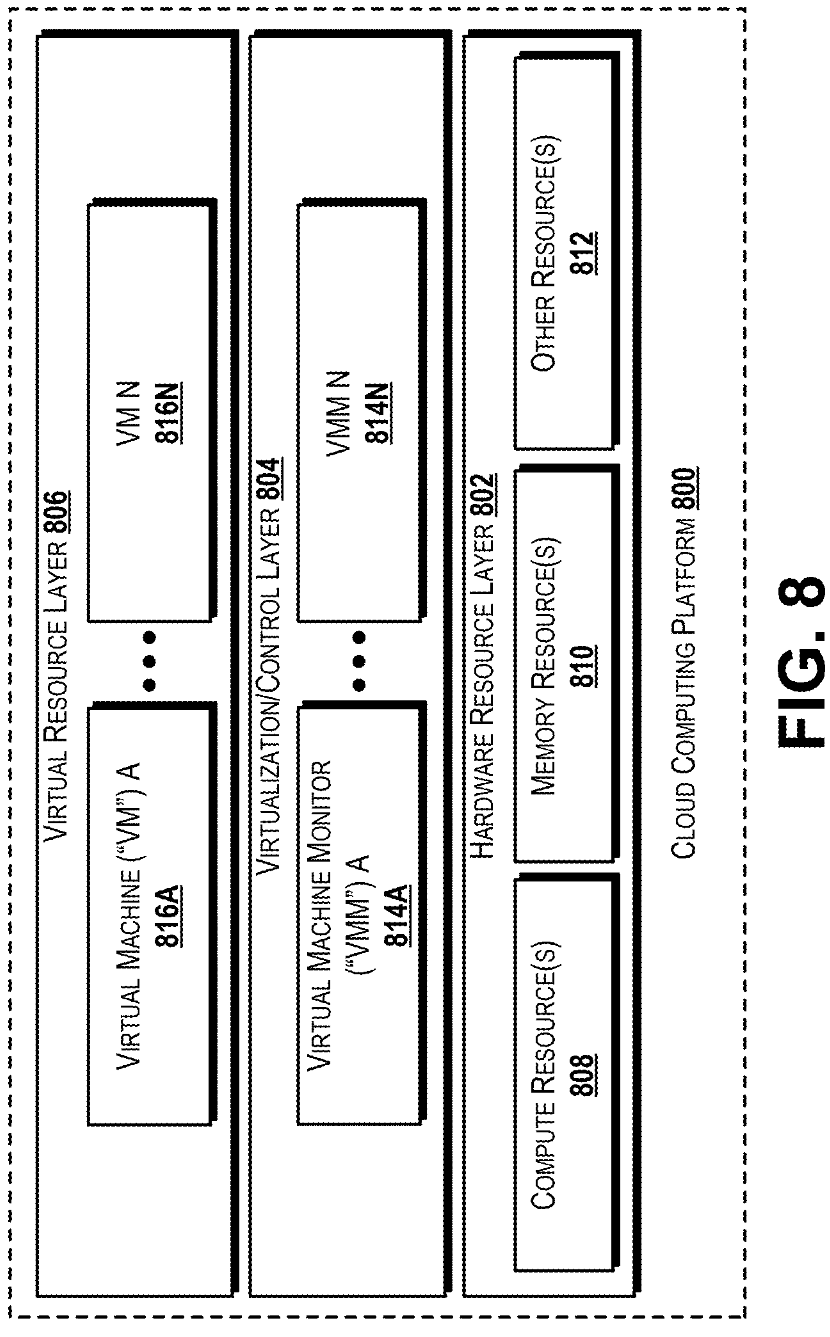
FIG. 8 is a diagram illustrating a computing environment capable of implementing aspects of the concepts and technologies disclosed herein, according to some illustrative embodiments of the concepts and technologies described herein.

FIG. 8 illustrates an illustrative architecture for a cloud computing platform 800 that can be capable of executing the software components described herein for providing a quantum entanglement communication service 106 and/or for interacting with the quantum entanglement communication service 106. Thus, it can be appreciated that in some embodiments of the concepts and technologies disclosed herein, the cloud computing platform 800 illustrated in FIG. 8 can be used to provide the functionality described herein with respect to the server computer 102, the transmitting device 116, the receiving device 120, and/or a device that hosts and/or executes the authentication service 126.

The cloud computing platform 800 thus may be utilized to execute any aspects of the software components presented herein. Thus, according to various embodiments of the concepts and technologies disclosed herein, the quantum entanglement communication service 106, the quantum entanglement communication application 118 118, and/or the authentication service 126 can be implemented, at least in part, on or by elements included in the cloud computing platform 800 illustrated and described herein. Those skilled in the art will appreciate that the illustrated cloud computing platform 800 is a simplification of but only one possible implementation of an illustrative cloud computing platform, and as such, the illustrated cloud computing platform 800 should not be construed as being limiting in any way.

In the illustrated embodiment, the cloud computing platform 800 can include a hardware resource layer 802, a virtualization/control layer 804, and a virtual resource layer 806. These layers and/or other layers can be configured to cooperate with each other and/or other elements of a cloud computing platform 800 to perform operations as will be described in detail herein. While connections are shown between some of the components illustrated in FIG. 8, it should be understood that some, none, or all of the components illustrated in FIG. 8 can be configured to interact with one another to carry out various functions described herein. In some embodiments, the components are arranged so as to communicate via one or more networks such as, for example, the network 104 illustrated and described hereinabove (not shown in FIG. 8). Thus, it should be understood that FIG. 8 and the following description are intended to provide a general understanding of a suitable environment in which various aspects of embodiments can be implemented, and should not be construed as being limiting in any way.

The hardware resource layer 802 can provide hardware resources. In the illustrated embodiment, the hardware resources can include one or more compute resources 808, one or more memory resources 810, and one or more other resources 812. The compute resource(s) 808 can include one or more hardware components that can perform computations to process data, and/or to execute computer-executable instructions of one or more application programs, operating systems, services, and/or other software illustrated and described herein.

According to various embodiments, the compute resources 808 can include one or more central processing units ("CPUs"). The CPUs can be configured with one or more processing cores. In some embodiments, the compute resources 808 can include one or more graphics processing units ("GPUs"). The GPUs can be configured to accelerate operations performed by one or more CPUs, and/or to perform computations to process data, and/or to execute computer-executable instructions of one or more application programs, operating systems, and/or other software that may or may not include instructions that are specifically graphics computations and/or related to graphics computations. In some embodiments, the compute resources 808 can include one or more discrete GPUs. In some other embodiments, the compute resources 808 can include one or more CPU and/or GPU components that can be configured in accordance with a co-processing CPU/GPU computing model. Thus, it can be appreciated that in some embodiments of the compute resources 808, a sequential part of an application can execute on a CPU and a computationally-intensive part of the application can be accelerated by the GPU. It should be understood that this example is illustrative, and therefore should not be construed as being limiting in any way.

In some embodiments, the compute resources 808 also can include one or more system on a chip ("SoC") components. It should be understood that an SoC component can operate in association with one or more other components as illustrated and described herein, for example, one or more of the memory resources 810 and/or one or more of the other resources 812. In some embodiments in which an SoC component is included, the compute resources 808 can be or can include one or more embodiments of the SNAPDRAGON brand family of SoCs, available from QUALCOMM of San Diego, California; one or more embodiment of the TEGRA brand family of SoCs, available from NVIDIA of Santa Clara, California; one or more embodiment of the HUMMINGBIRD brand family of SoCs, available from SAMSUNG of Seoul, South Korea; one or more embodiment of the Open Multimedia Application Platform ("OMAP") family of SoCs, available from TEXAS INSTRUMENTS of Dallas, Texas; one or more customized versions of any of the above SoCs; and/or one or more other brand and/or one or more proprietary SoCs.

The compute resources 808 can be or can include one or more hardware components arranged in accordance with an ARM architecture, available for license from ARM HOLDINGS of Cambridge, United Kingdom. Alternatively, the compute resources 808 can be or can include one or more hardware components arranged in accordance with an x86 architecture, such as an architecture available from INTEL CORPORATION of Mountain View, California, and others. Those skilled in the art will appreciate the implementation of the compute resources 808 can utilize various computation architectures and/or processing architectures. As such, the various example embodiments of the compute resources 808 as mentioned hereinabove should not be construed as being limiting in any way. Rather, implementations of embodiments of the concepts and technologies disclosed herein can be implemented using compute resources 808 having any of the particular computation architecture and/or combination of computation architectures mentioned herein as well as other architectures.

Although not separately illustrated in FIG. 8, it should be understood that the compute resources 808 illustrated and described herein can host and/or execute various services, applications, portals, and/or other functionality illustrated and described herein. Thus, the compute resources 808 can host and/or can execute the quantum entanglement communication service 106, the quantum entanglement communication application 118, the authentication service 126, and/or other applications or services illustrated and described herein.

The memory resource(s) 810 can include one or more hardware components that can perform or provide storage operations, including temporary and/or permanent storage operations. In some embodiments, the memory resource(s) 810 can include volatile and/or non-volatile memory implemented in any method or technology for storage of information such as computer-readable instructions, data structures, program modules, or other data disclosed herein. Computer storage media is defined hereinabove and therefore should be understood as including, in various embodiments, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium that can be used to store data and that can be accessed by the compute resources 808, subject to the definition of "computer storage media" provided above (e.g., as excluding waves and signals per se and/or communication media as defined in this application).

Although not illustrated in FIG. 8, it should be understood that the memory resources 810 can host or store the various data illustrated and described herein including, but not limited to, the request 114, the token 124, the data 128, the data access request 130, the measurement data 132, and/or other data, if desired. It should be understood that this example is illustrative, and therefore should not be construed as being limiting in any way.

The other resource(s) 812 can include any other hardware resources that can be utilized by the compute resources(s) 808 and/or the memory resource(s) 810 to perform operations. The other resource(s) 812 can include one or more input and/or output processors (e.g., a network interface controller and/or a wireless radio), one or more modems, one or more codec chipsets, one or more pipeline processors, one or more fast Fourier transform ("FFT") processors, one or more digital signal processors ("DSPs"), one or more speech synthesizers, combinations thereof, or the like.

The hardware resources operating within the hardware resource layer 802 can be virtualized by one or more virtual machine monitors ("VMMs") 814A-814N (also known as "hypervisors;" hereinafter "VMMs 814"). The VMMs 814 can operate within the virtualization/control layer 804 to manage one or more virtual resources that can reside in the virtual resource layer 806. The VMMs 814 can be or can include software, firmware, and/or hardware that alone or in combination with other software, firmware, and/or hardware, can manage one or more virtual resources operating within the virtual resource layer 806.

The virtual resources operating within the virtual resource layer 806 can include abstractions of at least a portion of the compute resources 808, the memory resources 810, the other resources 812, or any combination thereof. These abstractions are referred to herein as virtual machines ("VMs"). In the illustrated embodiment, the virtual resource layer 806 includes VMs 816A-816N (hereinafter "VMs 816").

Based on the foregoing, it should be appreciated that systems and methods for a quantum entanglement communication service have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising:

a first computer comprising a processor; and a memory that stores computer-executable instructions that, when executed by the processor, cause the processor to perform operations comprising receiving, at the first computer and from a transmitting device that is in communication with a receiving device, a request for an entangled particle pair, wherein the first computer comprises an entangled particle pair generator, and wherein the transmitting device generates the request in response to receiving a data access request from the receiving device, determining, by the first computer, a number of bits that are included in a token to be used by the transmitting device and the receiving device, wherein each of the transmitting device and the receiving device stores the token, and wherein the token comprises a first bit string comprising a first bit, generating a first entangled particle pair for the first bit, sending a first entangled particle from the first entangled particle pair to the transmitting device, and sending a second entangled particle from the first entangled particle pair to the receiving device, wherein the receiving device sends, to the transmitting device, measurement data that corresponds to a measurement observed at the receiving device after interacting the first bit with the second entangled particle from the first entangled particle pair, and wherein the transmitting device determines an operation to perform on the second entangled particle of the first entangled particle pair, performs the operation on the second entangled particle, measures a state of the first entangled particle, the state comprising a value, generates a second bit string comprising a number that corresponds to the value, and sends the second bit string to an authentication service to authenticate the receiving device.

2. The system of claim 1, wherein the measurement comprises a value of 00, and the operation on the second entangled particle comprises measuring the state of the second entangled particle.

3. The system of claim 1, wherein the measurement comprises a value of 01, and the operation on the second entangled particle comprises performing an X gate operation on the second entangled particle.

4. The system of claim 1, wherein the measurement comprises a value of 10, and the operation on the second entangled particle comprises performing an Z gate operation on the second entangled particle.

5. The system of claim 1, wherein the measurement comprises a value of 11, and the operation on the second entangled particle comprises performing an X gate operation and a Z gate operation on the second entangled particle.

6. The system of claim 1, wherein the request specifies endpoints of a communication link over which the data is to be transmitted, and wherein the endpoints comprise the transmitting device and the receiving device.

7. The system of claim 1, wherein the computer-executable instructions, when executed by the processor, cause the processor to perform operations further comprising determining if the token comprises another bit, and in response to determining that the token comprises the other bit:

receiving another instance of measurement data, wherein the other instance of measurement data comprises another measurement observed after interacting a second bit of the token with a third entangled particle from another entangled particle pair;

obtaining a fourth entangled particle;

determining another operation to perform on the fourth entangled particle based on the other value;

performing the operation on the fourth entangled particle;

measuring a state of the fourth entangled particle, the state comprising another value; and adding another number that corresponds to the other value to the second bit string.

8. A method comprising:

receiving, at a first computer comprising a processor and from a transmitting device that is in communication with a receiving device, a request for an entangled particle pair, wherein the first computer comprises an entangled particle pair generator, and wherein the transmitting device generates the request in response to receiving a data access request from the receiving device;

determining, by the first computer, a number of bits that are included in a token to be used by the transmitting device and the receiving device, wherein each of the transmitting device and the receiving device stores the token, and wherein the token comprises a first bit string comprising a first bit;

generating, by the first computer, a first entangled particle pair for the first bit;

sending, by the first computer, a first entangled particle from the first entangled particle pair to the transmitting device; and sending, the first computer, a second entangled particle from the first entangled particle pair to the receiving device, wherein the receiving device sends, to the transmitting device, measurement data that corresponds to a measurement observed at the receiving device after interacting the first bit with the second entangled particle from the first entangled particle pair, and wherein the transmitting device determines an operation to perform on the second entangled particle of the first entangled particle pair, performs the operation on the second entangled particle, measures a state of the first entangled particle, the state comprising a value, generates a second bit string comprising a number that corresponds to the value, and sends the second bit string to an authentication service to authenticate the receiving device.

9. The method of claim 8, wherein the measurement comprises a value of 00, and the operation on the second entangled particle comprises measuring the state of the second entangled particle.

10. The method of claim 8, wherein the measurement comprises a value of 01, and the operation on the second entangled particle comprises performing an X gate operation on the second entangled particle.

11. The method of claim 8, wherein the measurement comprises a value of 10, and the operation on the second entangled particle comprises performing an Z gate operation on the second entangled particle.

12. The method of claim 8, wherein the measurement comprises a value of 11, and the operation on the second entangled particle comprises performing an X gate operation and a Z gate operation on the second entangled particle.

13. The method of claim 8, wherein the request specifies the number of bits in the token, and wherein the request for generation of the entangled particle pair comprises a request to generate the number of entangled particle pairs.

14. The method of claim 8, wherein the request specifies endpoints of a communication link over which the data is to be transmitted, wherein the endpoints comprise the transmitting device and the receiving device.

15. The method of claim 8, further comprising determining, by the processor, if the token comprises another bit, and in response to determining that the token comprises the other bit:

receiving another instance of measurement data, wherein the other instance of measurement data comprises another measurement observed after interacting a second bit of the token with a third entangled particle from another entangled particle pair;

obtaining a fourth entangled particle;

determining another operation to perform on the fourth entangled particle based on the other value;

performing the operation on the fourth entangled particle;

measuring a state of the fourth entangled particle, the state comprising another value; and adding another number that corresponds to the other value to the second bit string.

16. A computer storage medium having computer-executable instructions stored thereon that, when executed by a processor, cause the processor to perform operations comprising:

receiving, at a first computer and from a transmitting device that is in communication with a receiving device, a request for an entangled particle pair, wherein the first computer comprises an entangled particle pair generator, and wherein the transmitting device generates the request in response to receiving a data access request from the receiving device;

determining, by the first computer, a number of bits that are included in a token to be used by the transmitting device and the receiving device, wherein each of the transmitting device and the receiving device stores the token, and wherein the token comprises a first bit string comprising a first bit;

generating a first entangled particle pair for the first bit;

sending a first entangled particle from the first entangled particle pair to the transmitting device; and sending a second entangled particle from the first entangled particle pair to the receiving device, wherein the receiving device sends, to the transmitting device, measurement data that corresponds to a measurement observed at the receiving device after interacting the first bit with the second entangled particle from the first entangled particle pair, and wherein the transmitting device determines an operation to perform on the second entangled particle of the first entangled particle pair, performs the operation on the second entangled particle, measures a state of the first entangled particle, the state comprising a value, generates a second bit string comprising a number that corresponds to the value, and sends the second bit string to an authentication service to authenticate the receiving device.

17. The computer storage medium of claim 16, wherein the request specifies endpoints of a communication link over which the data is to be transmitted, and wherein the endpoints comprise the transmitting device and the receiving device.

18. The computer storage medium of claim 16, wherein the request specifies the number of bits in the token, and wherein the request for generation of the entangled particle pair comprises a request to generate the number of entangled particle pairs.

19. The computer storage medium of claim 16, wherein the request specifies endpoints of a communication link over which the data is to be transmitted, wherein the endpoints comprise the transmitting device and the receiving device.

20. The computer storage medium of claim 16, wherein the computer-executable instructions, when executed by the processor, cause the processor to perform operations further comprising determining if the token comprises another bit, and in response to determining that the token comprises the other bit:

receiving another instance of measurement data, wherein the other instance of measurement data comprises another measurement observed after interacting a second bit of the token with a third entangled particle from another entangled particle pair;

obtaining a fourth entangled particle;

determining another operation to perform on the fourth entangled particle based on the other value;

performing the operation on the fourth entangled particle;

measuring a state of the fourth entangled particle, the state comprising another value; and adding another number that corresponds to the other value to the second bit string.

* * * * *